US009777678B2

(12) United States Patent
Dudar et al.

(10) Patent No.: US 9,777,678 B2
(45) Date of Patent: Oct. 3, 2017

(54) LATCHABLE VALVE AND METHOD FOR OPERATION OF THE LATCHABLE VALVE

(71) Applicant: Ford Global Technologies, LLC, Dearborn, MI (US)

(72) Inventors: Aed M. Dudar, Canton, MI (US); Russell Randall Pearce, Ann Arbor, MI (US); Dennis Seung-Man Yang, Canton, MI (US); Robert Ognjanovski, Jr., Shelby Township, MI (US); Mahmoud Yousef Ghannam, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 143 days.

(21) Appl. No.: 14/708,023

(22) Filed: May 8, 2015

(65) Prior Publication Data
US 2016/0222924 A1 Aug. 4, 2016

Related U.S. Application Data

(60) Provisional application No. 62/111,038, filed on Feb. 2, 2015.

(51) Int. Cl.
*F02M 25/08* (2006.01)
*F16K 31/06* (2006.01)
(Continued)

(52) U.S. Cl.
CPC ... *F02M 25/0836* (2013.01); *B60K 15/03504* (2013.01); *B60K 15/03519* (2013.01);
(Continued)

(58) Field of Classification Search
CPC ....... F02M 25/0836; F02M 2025/0845; B60K 15/03504; B60K 15/03519;
(Continued)

(56) References Cited

U.S. PATENT DOCUMENTS 2,269,016 A * 1/1942 Gille ................... F16K 31/0679
236/75
3,789,876 A * 2/1974 Kempton ............ F16K 37/0033
137/554
(Continued)

FOREIGN PATENT DOCUMENTS

EP 1457661 A2 9/2004

OTHER PUBLICATIONS

Deronne, M. et al., "The Development and Implementation of an Engine Off Natural Vacuum Test for Diagnosing Small Leaks in Evaporative Emissions Systems," SAE Technical Paper Series No. 2003-01-0719, 2003 SAE World Congress, Detroit, Michigan, Mar. 3-6, 2003, 13 pages.

(Continued)

*Primary Examiner* — Thomas Moulis
*Assistant Examiner* — John Bailey
(74) *Attorney, Agent, or Firm* — James Dottavio; McCoy Russell LLP

(57) ABSTRACT

A fuel system is provided, including a fuel tank isolation valve comprising an actuation coil and a latchable valve shaft at least partially disposed within the actuation coil. A controller may be configured to indicate a position of the valve shaft based on a measured current-voltage relationship between the first and second terminal wires during a condition in which the magnetic field generated by actuation coil current has a flux density below a threshold required to adjust a position of the latchable valve shaft. In this way, the position of the latchable valve shaft may be indicated without moving the valve shaft, and without requiring a dedicated valve position sensor.

17 Claims, 7 Drawing Sheets

(51) Int. Cl.
*B60K 15/035* (2006.01)
*F16K 37/00* (2006.01)
*B60K 15/03* (2006.01)

(52) U.S. Cl.
CPC ...... *F16K 31/0655* (2013.01); *F16K 37/0041* (2013.01); *B60K 2015/0358* (2013.01); *B60K 2015/03302* (2013.01); *B60K 2015/03514* (2013.01); *B60K 2015/03561* (2013.01); *F02M 2025/0845* (2013.01)

(58) Field of Classification Search
CPC .. B60K 2015/03561; B60K 2015/0358; B60K 2015/03302; B60K 2015/03514; F16K 31/0655; F16K 37/0041
USPC ........ 123/516, 519, 520, 521, 458; 137/493, 137/495, 43, 583, 202, 351, 493.2, 493.4, 137/493.5, 493.6, 315.03, 487.5; 141/302, 368, 305, 307; 180/69.4; 220/746; 251/129.14, 129.15
See application file for complete search history.

(56) References Cited

U.S. PATENT DOCUMENTS

| | | | | |
|---|---|---|---|---|
| 3,810,489 | A * | 5/1974 | MacManus | F02M 37/0023 137/495 |
| 3,951,378 | A * | 4/1976 | Manor | F16K 31/082 137/625.65 |
| 4,033,513 | A * | 7/1977 | Long | F02D 41/32 239/499 |
| 4,809,742 | A * | 3/1989 | Grau | G01B 7/003 137/554 |
| 4,950,985 | A * | 8/1990 | Voss | G01D 5/243 324/207.16 |
| 4,984,601 | A * | 1/1991 | Andersson | B08B 9/00 137/486 |
| 5,048,577 | A * | 9/1991 | Kuusisto | B67D 7/0478 137/595 |
| 5,128,826 | A | 7/1992 | Yoneshige | |
| 5,218,308 | A * | 6/1993 | Bosebeck | B60G 17/01933 324/207.16 |
| 5,424,637 | A * | 6/1995 | Oudyn | F16H 61/0251 324/207.16 |
| 5,583,434 | A * | 12/1996 | Moyers | F16K 31/06 137/554 |
| 5,787,915 | A * | 8/1998 | Byers | F15B 13/0442 137/1 |
| 5,804,962 | A * | 9/1998 | Kather | F01L 9/04 123/90.11 |
| 5,878,729 | A | 3/1999 | Covert et al. | |
| 5,942,892 | A * | 8/1999 | Li | H01F 7/1844 137/554 |
| 6,021,652 | A * | 2/2000 | Walker | D06F 43/00 137/554 |
| 6,178,956 | B1 * | 1/2001 | Steinmann | F02M 35/10222 123/568.21 |
| 6,227,037 | B1 | 5/2001 | Kawamura et al. | |
| 6,351,199 | B1 * | 2/2002 | Perini | F16K 31/082 335/17 |
| 6,376,791 | B1 * | 4/2002 | Watanabe | H01H 33/185 218/123 |
| 6,378,505 | B1 | 4/2002 | Doering et al. | |
| 6,657,847 | B1 * | 12/2003 | Wright | F01L 9/04 361/152 |
| 6,837,224 | B2 | 1/2005 | Kidokoro et al. | |
| 6,917,203 | B1 | 7/2005 | Perotti et al. | |
| 6,973,924 | B1 | 12/2005 | Suzuki | |
| 6,986,341 | B2 | 1/2006 | Mitani et al. | |
| 6,988,369 | B2 | 1/2006 | Conete et al. | |
| 7,043,972 | B2 | 5/2006 | Matsubara et al. | |
| 7,140,235 | B2 | 11/2006 | McLain et al. | |
| 7,432,721 | B2 | 10/2008 | Rober | |
| 7,527,044 | B2 | 5/2009 | Dunkle et al. | |
| 7,762,241 | B2 | 7/2010 | Childress et al. | |
| 7,768,257 | B2 * | 8/2010 | Lueck | G01B 7/14 324/207.16 |
| 7,845,337 | B2 | 12/2010 | Song | |
| 7,987,840 | B2 | 8/2011 | Magner et al. | |
| 8,019,525 | B2 | 9/2011 | DeBastos et al. | |
| 8,074,627 | B2 | 12/2011 | Siddiqui | |
| 8,342,157 | B2 | 1/2013 | Der Manuelian et al. | |
| 8,353,273 | B2 | 1/2013 | McLain et al. | |
| 8,363,021 | B2 | 1/2013 | Krah et al. | |
| 8,424,563 | B2 * | 4/2013 | Haller | F16K 37/0041 137/554 |
| 8,657,587 | B2 * | 2/2014 | Sarkinen | A61M 5/14216 417/415 |
| 8,677,805 | B2 | 3/2014 | Simmons | |
| 9,217,397 | B2 * | 12/2015 | Peters | F02M 25/0854 |
| 2001/0048091 | A1 * | 12/2001 | Enomoto | F02M 59/466 251/129.15 |
| 2003/0042452 | A1 * | 3/2003 | Burke | F02M 25/0836 251/129.15 |
| 2004/0255916 | A1 * | 12/2004 | Ivens | F02M 25/0836 123/520 |
| 2005/0046531 | A1 | 3/2005 | Moyer et al. | |
| 2005/0127314 | A1 * | 6/2005 | Piehl | F15B 13/044 251/129.04 |
| 2005/0229878 | A1 * | 10/2005 | Taylor | G01D 5/20 123/90.11 |
| 2007/0257221 | A1 * | 11/2007 | Nishida | F01L 9/04 251/129.07 |
| 2011/0062356 | A1 * | 3/2011 | Pogel | F16K 31/06 251/129.01 |
| 2011/0079201 | A1 * | 4/2011 | Peters | F02M 25/0818 123/520 |
| 2012/0211087 | A1 * | 8/2012 | Dudar | F02D 41/0032 137/12 |
| 2013/0074589 | A1 | 3/2013 | Pursifull et al. | |
| 2014/0026866 | A1 | 1/2014 | Pifher et al. | |
| 2014/0069394 | A1 | 3/2014 | Jentz et al. | |
| 2014/0230795 | A1 * | 8/2014 | Jentz | F02M 25/0854 123/520 |
| 2015/0083087 | A1 * | 3/2015 | Pearce | F02M 25/0809 123/520 |
| 2015/0101577 | A1 * | 4/2015 | Balsdon | F02M 25/089 123/520 |
| 2015/0101677 | A1 * | 4/2015 | Balsdon | F02M 25/0836 137/198 |
| 2015/0101689 | A1 * | 4/2015 | Balsdon | F02M 25/0818 137/551 |
| 2015/0102039 | A1 * | 4/2015 | Balsdon | F02M 25/089 220/562 |
| 2015/0122228 | A1 * | 5/2015 | Bolger | F02M 25/0836 123/518 |
| 2015/0122229 | A1 * | 5/2015 | Dudar | F02M 25/0818 123/518 |
| 2015/0167861 | A1 * | 6/2015 | Ferrer Herrera | F16K 37/0041 239/73 |
| 2015/0345652 | A1 * | 12/2015 | Jefford | F16K 31/082 251/129.15 |
| 2016/0298579 | A1 * | 10/2016 | Peters | F16K 31/02 |

OTHER PUBLICATIONS

Anonymous, "A Natural Vacuum EVAP Leak Detection Method Utilizing an Electrically Latchable Valve," IP.com No. IPCOM000232440D, Nov. 8, 2013, 2 pages.
Anonymous, "An EVAP System with Energy Saving Latchable Valves," IP.com No. IPCOM000237278D, Jun. 11, 2014, 2 pages.

* cited by examiner

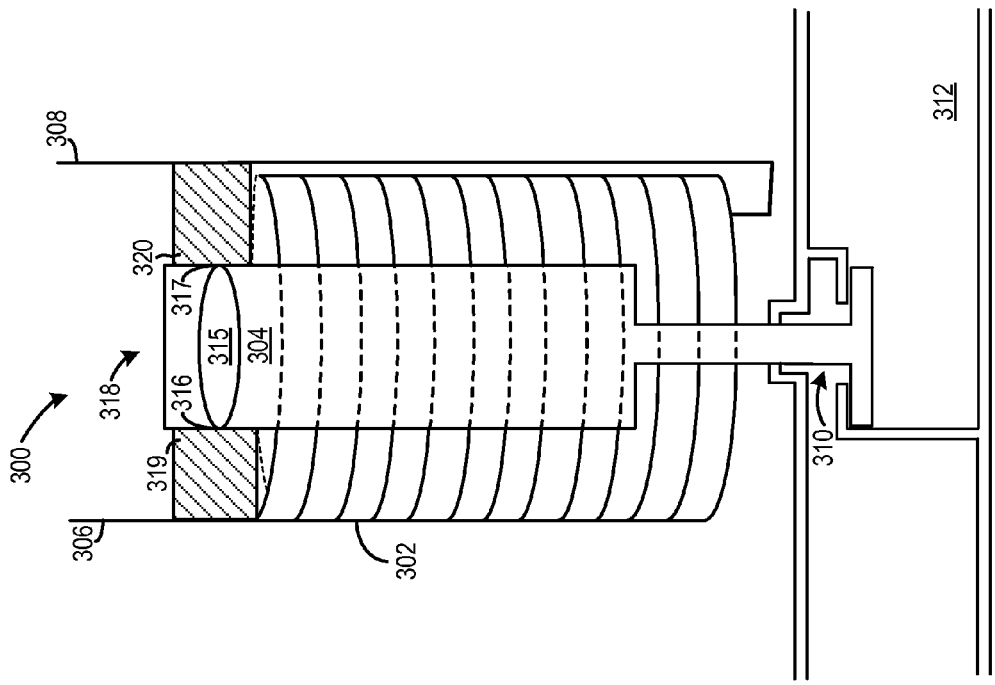
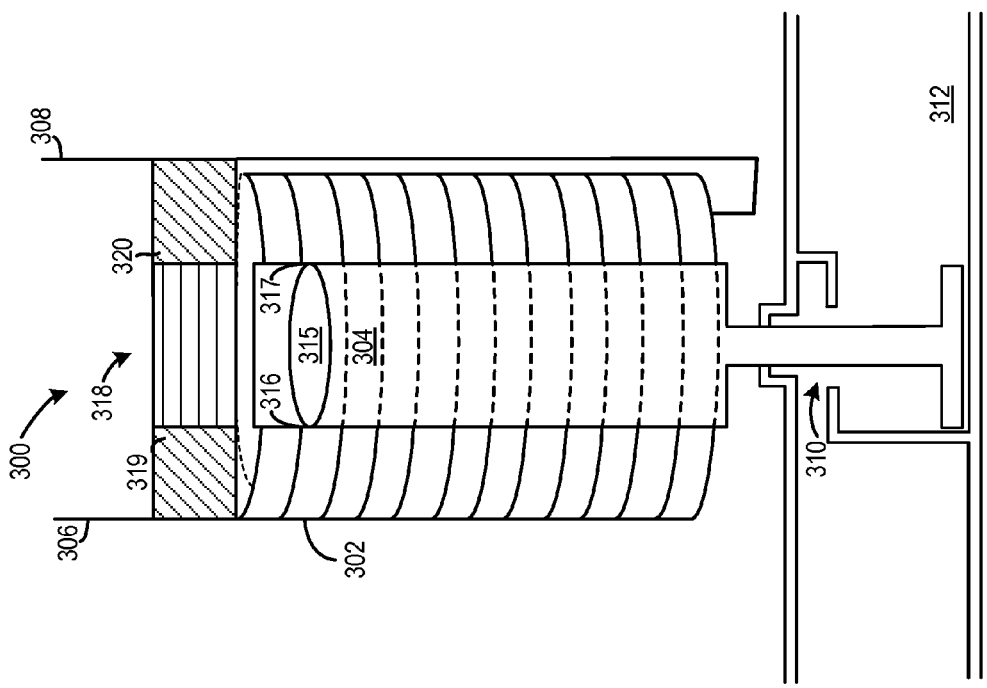

LATCHABLE VALVE AND METHOD FOR OPERATION OF THE LATCHABLE VALVE

CROSS REFERENCE TO RELATED APPLICATIONS

The present application claims priority to U.S. Provisional Patent Application No. 62/111,038, "LATCHABLE VALVE AND METHOD FOR OPERATION OF THE LATCHABLE VALVE," filed on Feb. 2, 2015, the entire contents of which are hereby incorporated by reference for all purposes.

FIELD

The present disclosure relates to an emission control system having a latchable valve and method for determining the valve configuration based on a voltage output of a circuit in the valve.

BACKGROUND AND SUMMARY

Vehicles having internal combustion engines employ fuel delivery systems with fuel tanks. Emission control systems may be provided in these vehicles to absorb fuel vapors generated during refueling events, during diurnal cycles, and during vehicle run time. An emission control system may include a fuel vapor canister coupled to the fuel tank configured to store fuel vapor in an adsorbent bed. The adsorbed fuel vapor may then be purged to an engine intake for combustion.

In vehicles such as hybrid-electric vehicles (HEVs) and other vehicles configured to operate for periods without combusting fuel, opportunities to purge the fuel vapor canister may be limited. In order to prevent run time losses from saturating the fuel vapor canister, a fuel tank isolation valve (FTIV) may be coupled between the fuel tank and the fuel vapor canister. By keeping the FTIV closed, fuel vapor remains trapped within the fuel tank. The FTIV may be opened to vent the fuel tank, and to allow refueling vapors to be flowed to the fuel vapor canister. As such, the FTIV may be closed during most periods of engine operation. However, FTIV's, among other solenoid valves, use a considerable amount of battery power to remain energized. Therefore, hatchable valves may be used to reduce the power consumption as well as the cost of the valve.

US 2012/0211087 discloses an electrically latchable FTIV. The latchable FTIV is pulsed via current to actuate the valve between a closed and open position. A controller (e.g., powertrain control module) keeps track of the valve position in memory. However, the valve position information may become invalid or indeterminate for a number of reasons such as tow battery, reflashing of the controller, memory corruption in the controller, and valve replacement. Invalid valve position information leaves the emission control system in an undesirable state which may lead to increased emissions. In order to determine the position of the valve, the valve may be actuated and a state of the fuel tank and/or emissions control system evaluated for change. This may take a considerable amount of time, and/or place the valve in a non-optimal position. In other examples, a dedicated position sensor may be coupled to the valve, though this may increase the cost and complexity of the valve, may require additional solenoid wiring, and may further require additional OBD testing to monitor the function of the position sensor.

The inventors herein have recognized the above issues, and have developed systems and methods to at least partially address them. In one example, a fuel system is provided, the fuel system comprising a fuel tank isolation valve coupled between a fuel tank and a fuel vapor canister. The fuel tank isolation valve comprises an actuation coil comprising a first terminal wire and a second terminal wire, the actuation coil configured to generate a magnetic field when the first and second terminal wires are switchably connected to an actuating voltage source, and a valve shaft at least partially disposed within the actuation coil, the valve shaft configured to change between an open position and a closed position in response to the actuation coil generating a magnetic field having a flux density above a threshold, wherein the valve shaft is configured to alternately latch in the open and closed positions such that the valve shaft is maintained in a latched-open or latched-closed position when the actuation coil is generating a magnetic field having a flux density below the threshold, and wherein the fuel tank and the fuel vapor canister are fluidically coupled when the valve shaft is in the open position but not when the valve shaft is in the closed position. The fuel system further comprises a controller configured to indicate a position of the valve shaft based on a measured current-voltage relationship between the first and second terminal wires during a condition in which the magnetic field generated by current through the actuation coil has a flux density below the threshold. In this way, the position of the valve shaft may be determined without adjusting the position of the valve shaft. In one example, the valve shaft includes an indicator coil that is selectively electrically coupled to the actuation coil based on valve shaft position. In this way, the measured current-voltage relationship between the first and second terminal wires may be significantly and predictably different when the valve shaft alternates between the open and closed positions.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter s not limited to implementations that solve any disadvantages noted above or in any part of this disclosure. Additionally, the above issues have been recognized by the inventors herein, and are not admitted to be known.

BRIEF DESCRIPTION OF THE DRAWINGS

FIG. 3 schematically shows an exemplary latchable valve having a non-energizable indicator coil in an open conformation.

FIG. 4 shows the exemplary latchable valve of FIG. 3 in a closed conformation.

DETAILED DESCRIPTION

Figure 5:
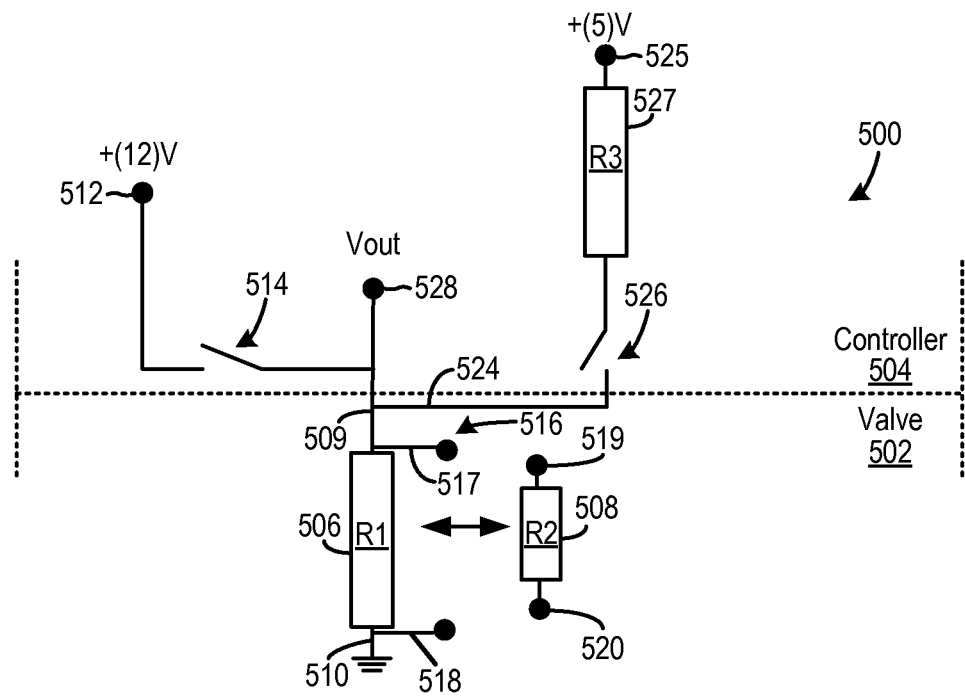
FIG. 5 schematically shows an exemplary valve circuit for a latchable valve in an open conformation.
Figure 6:
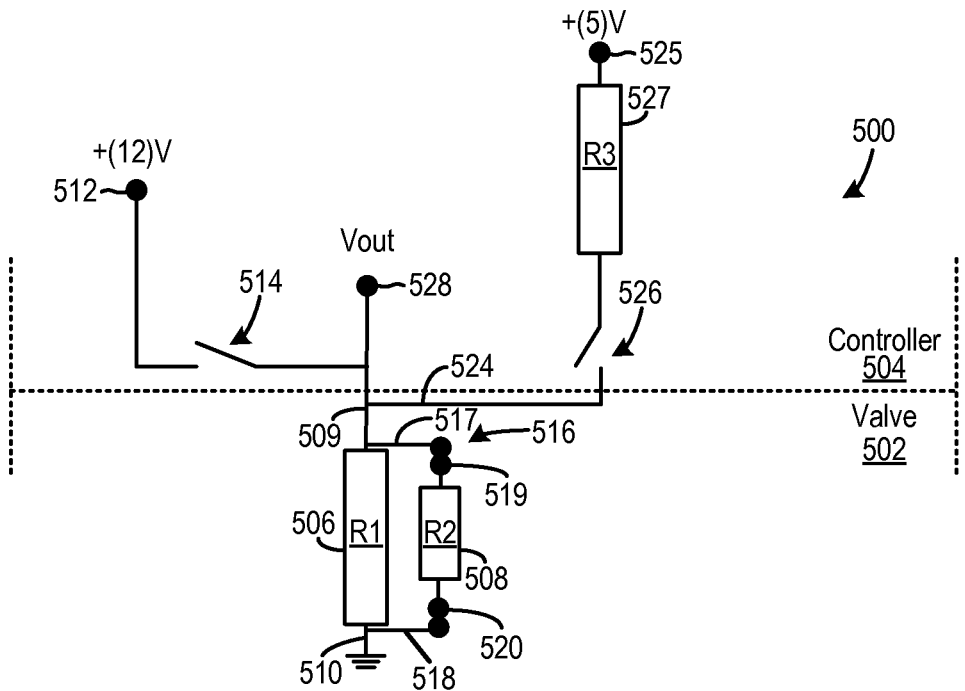
FIG. 6 schematically shows the exemplary valve circuit of FIG. 5 in a closed conformation.
Figure 7:
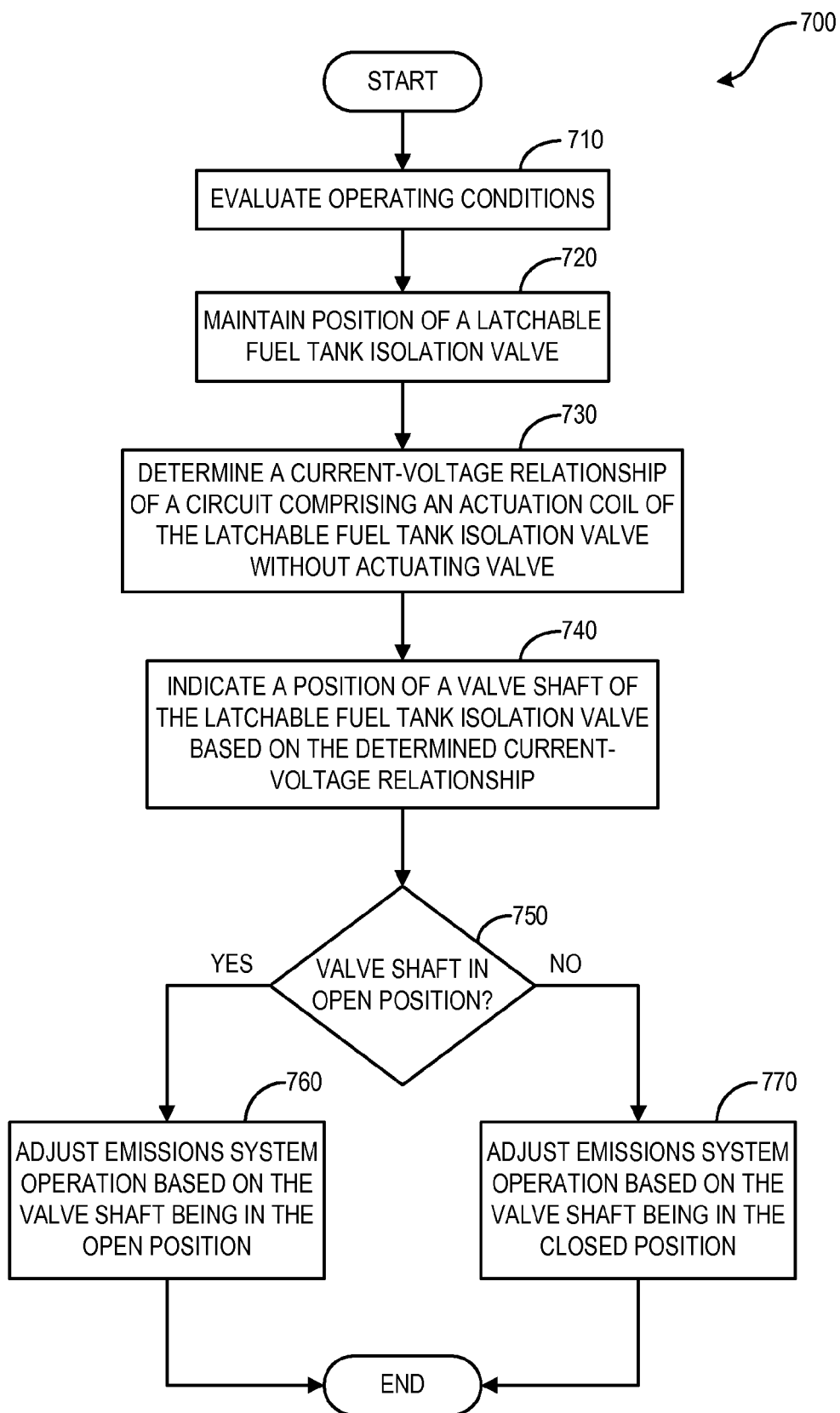
FIG. 7 shows a method for operation of an emission control system.
Figure 8:
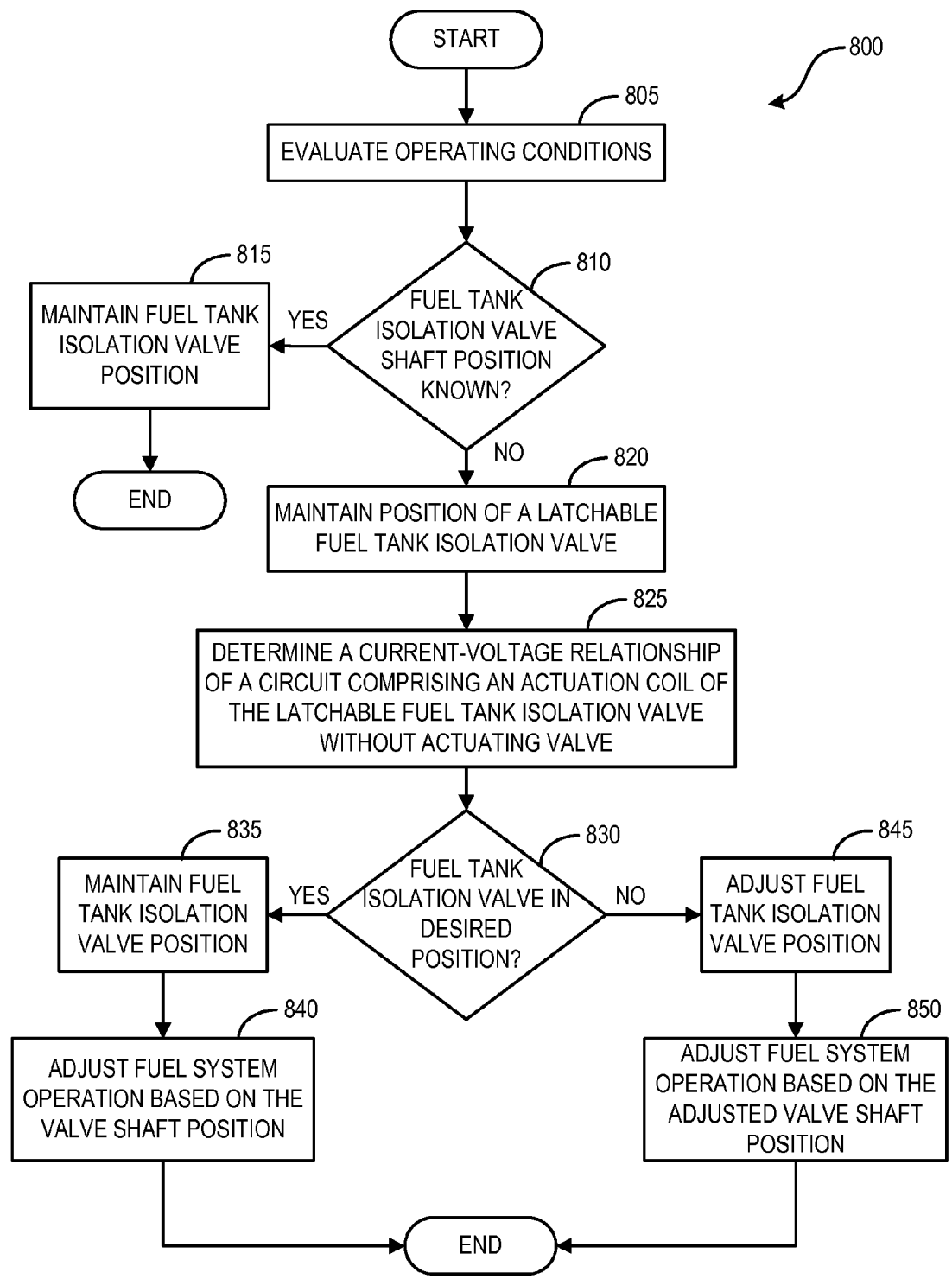
FIG. 8 shows method for operation of a fuel system.
Figure 9:
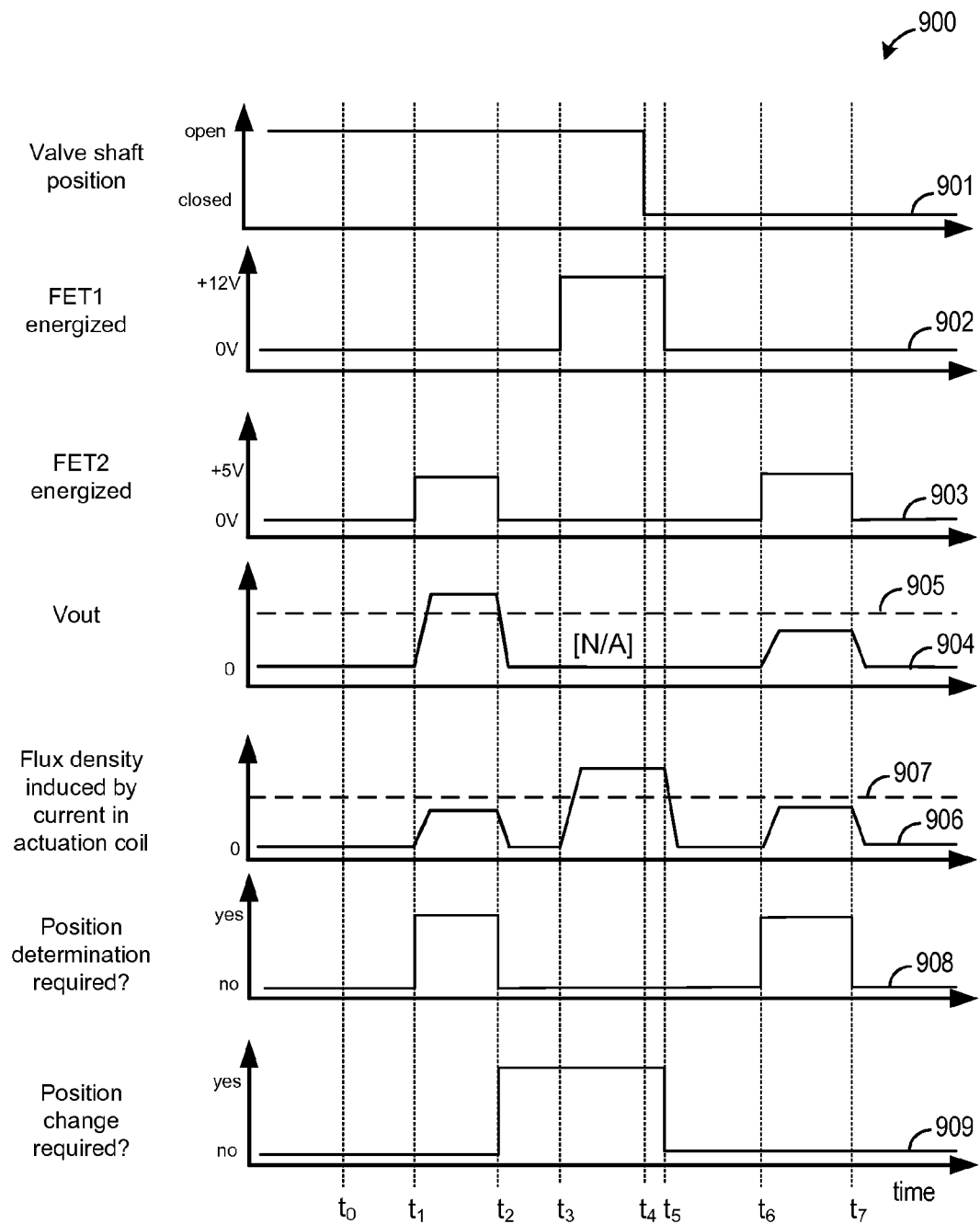
FIG. 9 shows an example timeline for operating an emission control system comprising a latchable valve.

This description relates to systems and methods for a latchable solenoid valve. In particular, the description relates to systems and methods for determining a position of a latchable solenoid valve. The latchable solenoid valve may be included in a fuel system for a vehicle, the fuel system coupled to an evaporative emissions system as shown schematically in FIG. 1. For example, the latchable solenoid valve may be deployed as a fuel tank isolation valve, coupled between a fuel tank and a fuel vapor canister and configured to regulate the flow of fuel vapor between the fuel tank and the fuel vapor canister. The position of the valve may be adjusted by applying a voltage to a solenoid coil, thus generating a magnetic field which actuates a valve shaft at least partially surrounded by the solenoid coil. For a latchable valve, such as the valve shown in FIG. 2, the valve shaft may latch into place in one or more positions, thus allowing the valve position to be maintained in a position when the voltage is disconnected from the solenoid coil. However, this requires the position of the valve to be stored in memory at a controller. If the memory is erased or corrupted, or the valve is replaced, the valve position may become indeterminate. A solution to this problem is shown in FIGS. 3 and 4. An indicator coil may be coupled to the valve shaft, such that the indicator coil is electrically coupled to a circuit comprising the solenoid (actuation) coil via an adaptor when in a first position, and decoupled when in a second position. FIG. 3 shows an exemplary valve in an open position where the indicator coil is not electrically coupled to the circuit, while FIG. 4 shows the exemplary valve in a closed position where the indicator coil is electrically coupled to the circuit. In this way, the nature of the current-voltage relationship between two terminal wires of the actuation coil changes as a function of the valve position. FIGS. 5 and 6 show an exemplary circuit that may be used to monitor the current-voltage relationship between two terminal wires of the actuation coil. A first voltage source may be switchably coupled to the actuation coil in order to energize the coil and adjust the position of the valve shaft, while a second voltage source may be switchably coupled to the actuation coil to monitor the current-voltage relationship without actuating the valve shaft. As shown in FIG. 6, closing of the valve results in a circuit with the two coils in parallel, whereas opening the valve results in a circuit with a single coil, as shown in FIG. 5. The change in resistance may thus be determined, and a valve position indicated. The systems shown in FIGS. 1-6 may enable methods for an emission system and fuel system, as shown in FIGS. 7 and 8, respectively. In the method of FIG. 7, the valve position may be determined while maintaining the valve position. Emissions system operations may then be adjusted based on the determined valve position. In the method of FIG. 8, the valve position may be determined responsive to an indication that the valve position is indeterminate. The valve position may then be adjusted if the valve is not in a desired position, and fuel system operations adjusted accordingly. An example timeline for monitoring and actuating a latchable valve is depicted in FIG. 9.

Figure 1:
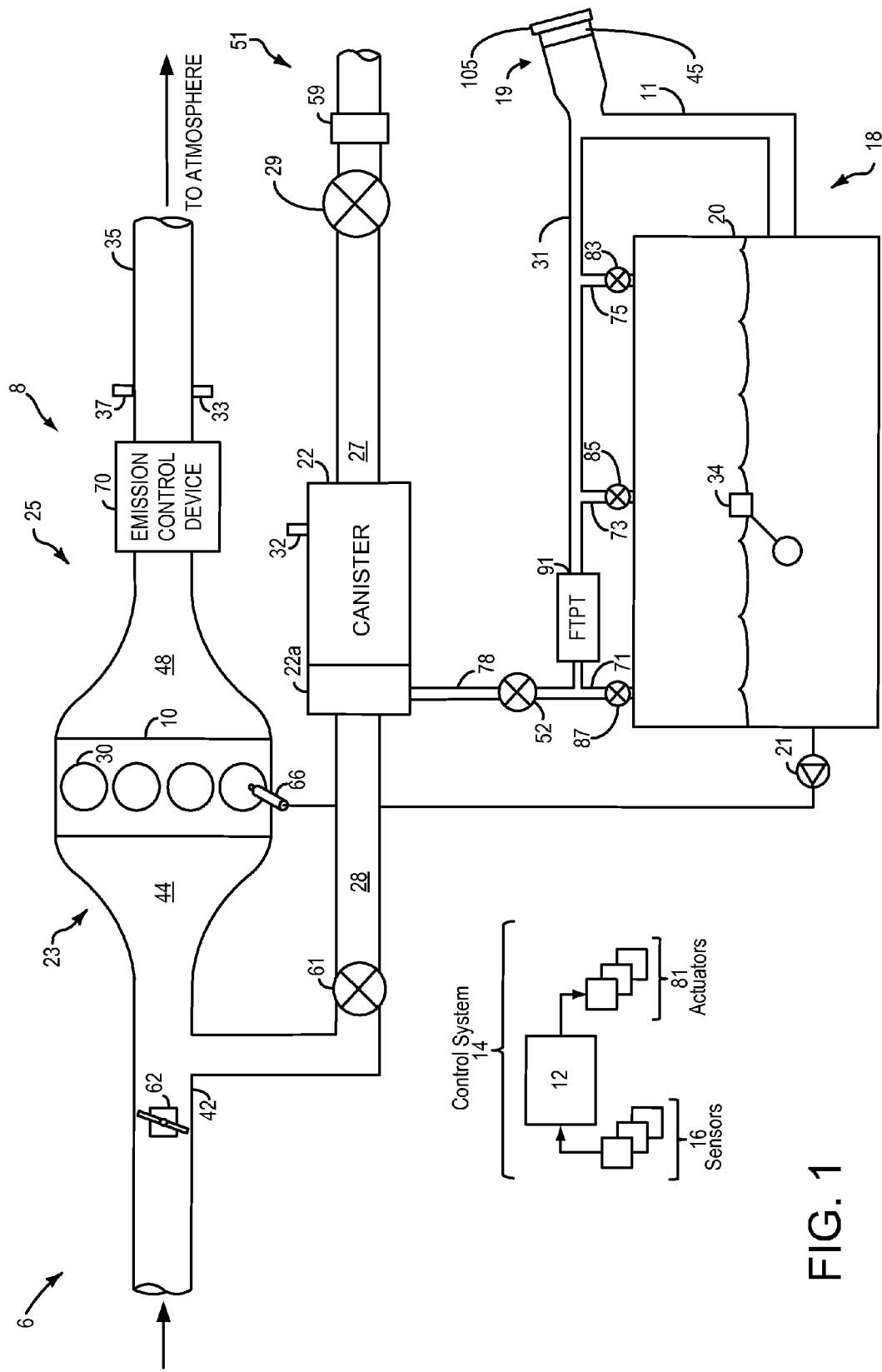
FIG. 1 shows a schematic depiction of an emission control system for an engine.

FIG. 1 shows a schematic depiction of a vehicle system 6. The vehicle system 6 includes an engine system 8 coupled to an emissions control system 51 and a fuel system 18. Emission control system 51 includes a fuel vapor container or canister 22 which may be used to capture and store fuel vapors. In some examples, vehicle system 6 may be a hybrid electric vehicle system.

The engine system 8 may include an engine 10 having a plurality of cylinders 30. The engine 10 includes an engine intake 23 and an engine exhaust 25. The engine intake 23 includes a throttle 62 fluidly coupled to the engine intake manifold 44 via an intake passage 42. The engine exhaust 25 includes an exhaust manifold 48 leading to an exhaust passage 35 that routes exhaust gas to the atmosphere. The engine exhaust 25 may include one or more emission control devices 70, which may be mounted in a close-coupled position in the exhaust. One or more emission control devices may include a three-way catalyst, lean NOx trap, diesel particulate filter, oxidation catalyst, etc. It will be appreciated that other components may be included in the engine such as a variety of valves and sensors.

Fuel system 18 may include a fuel tank 20 coupled to a fuel pump system 21. The fuel pump system 21 may include one or more pumps for pressurizing fuel delivered to the injectors of engine 10, such as the example injector 66 shown. While only a single injector 66 is shown, additional injectors are provided for each cylinder. It will be appreciated that fuel system 18 may be a return-less fuel system, a return fuel system, or various other types of fuel system. Fuel tank 20 may hold a plurality of fuel blends, including fuel with a range of alcohol concentrations, such as various gasoline-ethanol blends, including E10, E85, gasoline, etc., and combinations thereof. A fuel level sensor 34 located in fuel tank 20 may provide an indication of the fuel level ("Fuel Level Input") to controller 12. As depicted, fuel level sensor 34 may comprise a float connected to a variable resistor. Alternatively, other types of fuel level sensors may be used.

Vapors generated in fuel system 18 may be routed to an evaporative emissions control system 51 which includes a fuel vapor canister 22 via vapor recovery line 31, before being purged to the engine intake 23. Vapor recovery line 31 may be coupled to fuel tank 20 via one or more conduits and may include one or more valves for isolating the fuel tank during certain conditions. For example, vapor recovery line 31 may be coupled to fuel tank 20 via one or more or a combination of conduits 71, 73, and 75.

Further, in some examples, one or more fuel tank vent valves may be coupled to conduits 71, 73, or 75. Among other functions, fuel tank vent valves may allow a fuel vapor canister of the emissions control system to be maintained at a low pressure or vacuum without increasing the fuel evaporation rate from the tank (which would otherwise occur if the fuel tank pressure were lowered). For example, conduit 71 may include a grade vent valve (GVV) 87, conduit 73 may include a fill limit venting valve (FLVV) 85, and conduit 75 may include a grade vent valve (GVV) 83. Further, in some examples, recovery line 31 may be coupled to a fuel filler system 19. In some examples, fuel filler system may include a fuel cap 105 for sealing off the fuel filler system from the atmosphere. Refueling system 19 is coupled to fuel tank 20 via a fuel filler pipe or neck 11.

Further, refueling system 19 may include refueling lock 45. In some embodiments, refueling lock 45 may be a fuel cap locking mechanism. The fuel cap locking mechanism may be configured to automatically lock the fuel cap in a closed position so that the fuel cap cannot be opened. For example, the fuel cap 105 may remain locked via refueling lock 45 while pressure or vacuum in the fuel tank is greater than a threshold. In response to a refuel request, e.g., a vehicle operator initiated request, the fuel tank may be depressurized and the fuel cap unlocked after the pressure or vacuum in the fuel tank falls below a threshold. A fuel cap locking mechanism may be a latch or clutch, which, when engaged, prevents the removal of the fuel cap. The latch or clutch may be electrically locked, for example, by a solenoid, or may be mechanically locked, for example, by a pressure diaphragm.

In some embodiments, refueling lock 45 may be a filler pipe valve located at a mouth of fuel filler pipe 11. In such embodiments, refueling lock 45 may not prevent the removal of fuel cap 105. Rather, refueling lock 45 may prevent the insertion of a refueling pump into fuel filler pipe 11. The filler pipe valve may be electrically locked, for example by a solenoid, or mechanically locked, for example by a pressure diaphragm.

In some embodiments, refueling lock 45 may be a refueling door lock, such as a latch or a clutch which locks a refueling door located in a body panel of the vehicle. The refueling door lock may be electrically locked, for example by a solenoid, or mechanically locked, for example by a pressure diaphragm.

In embodiments where refueling lock 45 is locked using an electrical mechanism, refueling lock 45 may be unlocked by commands from controller 12, for example, when a fuel tank pressure decreases below a pressure threshold. In embodiments where refueling lock 45 is locked using a mechanical mechanism, refueling lock 45 may be unlocked via a pressure gradient, for example, when a fuel tank pressure decreases to atmospheric pressure.

Emissions control system 51 may include one or more emissions control devices, such as one or more fuel vapor canisters 22 filled with an appropriate adsorbent, the canisters are configured to temporarily trap fuel vapors (including vaporized hydrocarbons) during fuel tank refilling operations and "running loss" (that is, fuel vaporized during vehicle operation). In one example, the adsorbent used is activated charcoal. Emissions control system 51 may further include a canister ventilation path or vent line 27 which may route gases out of the canister 22 to the atmosphere when storing, or trapping, fuel vapors from fuel system 18.

Canister 22 may include a buffer 22a (or buffer region), each of the canister and the buffer comprising the adsorbent. As shown, the volume of buffer 22a may be smaller than (e.g., a fraction of) the volume of canister 22. The adsorbent in the buffer 22a may be same as, or different from, the adsorbent in the canister (e.g., both may include charcoal). Buffer 22a may be positioned within canister 22 such that during canister loading, fuel tank vapors are first adsorbed within the buffer, and then when the buffer is saturated, further fuel tank vapors are adsorbed in the canister. In comparison, during canister purging, fuel vapors are first desorbed from the canister (e.g., to a threshold amount) before being desorbed from the buffer. In other words, loading and unloading of the buffer is not linear with the loading and unloading of the canister. As such, the effect of the canister buffer is to dampen any fuel vapor spikes flowing from the fuel tank to the canister, thereby reducing the possibility of any fuel vapor spikes going to the engine. One or more temperature sensors 32 may be coupled to and/or within canister 22. As fuel vapor is adsorbed by the adsorbent in the canister, heat is generated (heat of adsorption). Likewise, as fuel vapor is desorbed by the adsorbent in the canister, heat is consumed. In this way, the adsorption and desorption of fuel vapor by the canister may be monitored and estimated based on temperature changes within the canister.

Vent line 27 may also allow fresh air to be drawn into canister 22 when purging stored fuel vapors from fuel system 18 to engine intake 23 via purge line 28 and purge valve 61. For example, purge valve 61 may be normally closed but may be opened during certain conditions so that vacuum from engine intake manifold 44 is provided to the fuel vapor canister for purging. In some examples, vent line 27 may include an air filter 59 disposed therein upstream of a canister 22.

Flow of air and vapors between canister 22 and the atmosphere may be regulated by a canister vent valve 29. Canister vent valve 29 may be a normally open valve, so that fuel tank isolation valve 52 (FTIV) may control venting of fuel tank 20 with the atmosphere. FTIV 52 may be positioned between the fuel tank and the fuel vapor canister, which may be fluidically coupled via conduit 78. FTIV 52 may be a normally closed valve, that when opened, allows for the venting of fuel vapors from fuel tank 20 to canister 22. Fuel vapors may then be vented to atmosphere via canister vent valve 29, or purged to engine intake system 23 via canister purge valve 61.

Fuel system 18 may be operated by controller 12 in a plurality of modes by selective adjustment of the various valves and solenoids. For example, the fuel system may be operated in a fuel vapor storage mode (e.g., during a fuel tank refueling operation and with the engine not running), wherein the controller 12 may open FTIV 52 and canister vent valve 29 while closing canister purge valve (CPV) 61 to direct refueling vapors into canister 22 while preventing fuel vapors from being directed into the intake manifold.

As another example, the fuel system may be operated in a refueling mode (e.g., when fuel tank refueling is requested by a vehicle operator), wherein the controller 12 may open FTIV 52 and canister vent valve 29, while maintaining canister purge valve 61 closed, to depressurize the fuel tank before allowing enabling fuel to be added therein. As such, FTIV 52 may be kept open during the refueling operation to allow refueling vapors to be stored in the canister. After refueling is completed, the isolation valve may be closed.

As yet another example, the fuel system may be operated in a canister purging mode (e.g., after an emission control device light-off temperature has been attained and with the engine running), wherein the controller 12 may open canister purge valve 61 and canister vent valve 29 while closing FTIV 52. Herein, the vacuum generated by the intake manifold of the operating engine may be used to draw fresh air through vent 27 and through fuel vapor canister 22 to purge the stored fuel vapors into intake manifold 44. In this mode, the purged fuel vapors from the canister are combusted in the engine. The purging may be continued until the stored fuel vapor amount in the canister is below a threshold.

Controller 12 may comprise a portion of a control system 14. Control system 14 is shown receiving information from a plurality of sensors 16 (various examples of which are described herein) and sending control signals to a plurality of actuators 81 (various examples of which are described herein). As one example, sensors 16 may include exhaust gas sensor 37 located upstream of the emission control device, temperature sensor 33, and pressure sensor 91. Other sensors such as pressure, temperature, air/fuel ratio, and composition sensors may be coupled to various locations in the vehicle system 6. As another example, the actuators may include fuel injector 66, throttle 62, FTIV 52, pump 21, and refueling lock 45. The controller may receive input data from the various sensors, process the input data, and trigger the actuators in response to the processed input data based on instruction or code programmed therein corresponding to one or more routines. Example control routines are described herein and with reference to FIGS. 7 and 8.

Leak detection routines may be intermittently performed by controller 12 on fuel system 18 to confirm that the fuel system is not degraded. As such, leak detection routines may be performed while the engine is off (engine-off leak test) using engine-off natural vacuum (EONV) generated due to a change in temperature and pressure at the fuel tank following engine shutdown and/or with vacuum supplemented from a vacuum pump (not shown). Alternatively, leak detection routines may be performed while the engine is running by operating a vacuum pump and/or using engine intake manifold vacuum.

CVV 29, FTIV 52, and/or CPV 61 may be configured as latchable solenoid valves. A latchable solenoid valve may be configured to have a default position (e.g., open) and a latchable position (e.g., closed). In this way, the latchable solenoid valve may be maintained in either the default or latchable position without requiring the solenoid coil to be energized, thus saving battery power during vehicle operation, and allowing a valve to be placed in either the default or latchable position when the vehicle is turned off. This may allow, for example, a normally-open CVV to be closed for a duration to allow for evaporative emissions leak testing while the vehicle controller is operating in a sleep or low-power mode. Although described herein as having a default and latchable position, a latchable solenoid valve may be latchable in two or more positions, including positions intermediate the open and closed positions, and may or may not be biased to have a default position.

Figure 2:
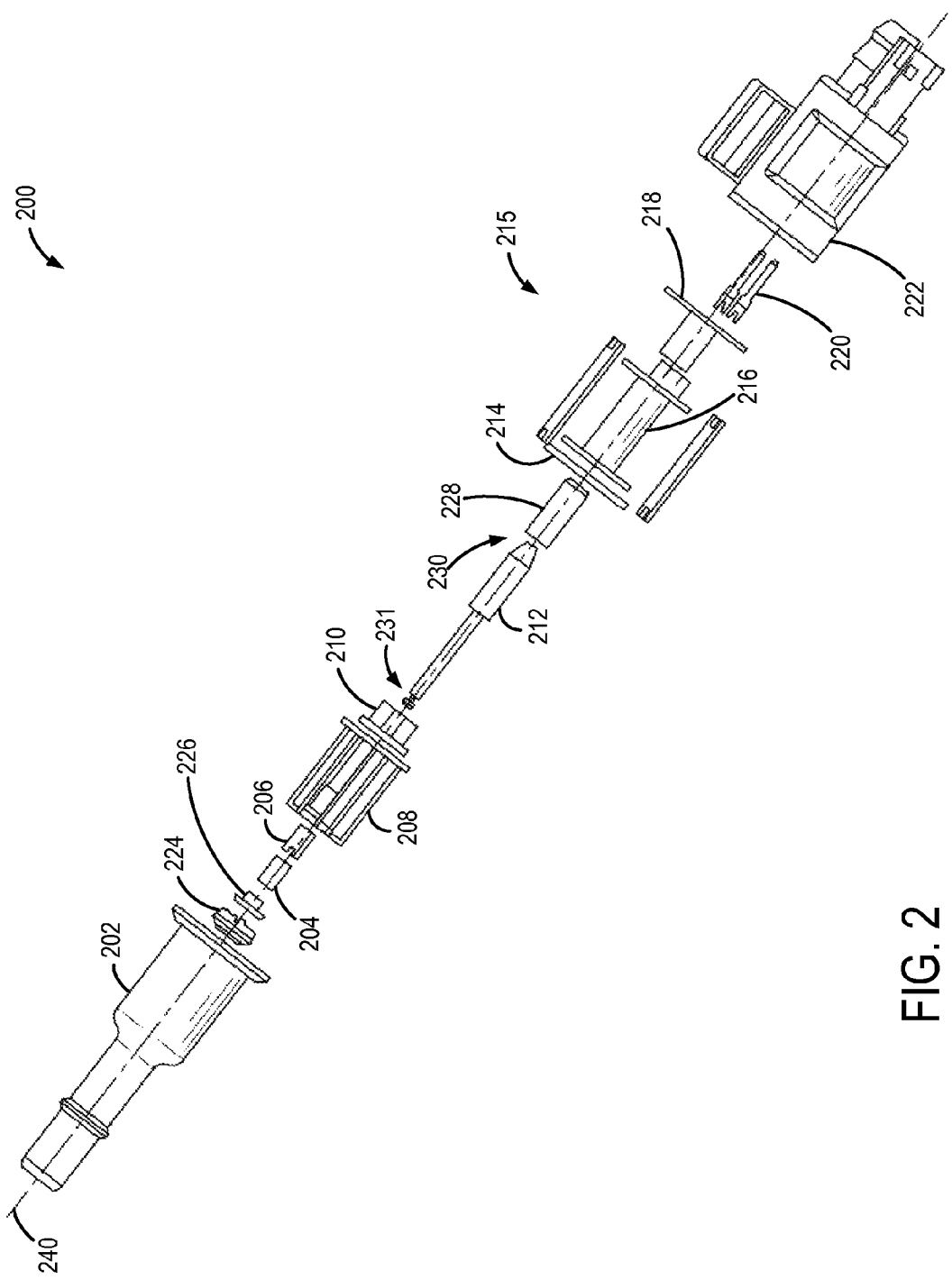
FIG. 2 shows an exploded view of an exemplary latchable valve that may be included as a fuel tank isolation valve in an emission control system.

FIG. 2 shows an exploded view of a latchable solenoid valve 200. Components of latchable valve 200 will be described in the context of a latchable fuel tank isolation valve, such as FTIV 52 of FIG. 1, but it should be understood that similar latchable solenoid valves may be used for other purposes within an evaporative emissions system or elsewhere. Latchable solenoid valve 200 includes a cap 202 that may be fluidically coupled to a fuel tank of a vehicle, such as fuel tank 20 of FIG. 1. For example, cap 202 may be configured to directly couple the latchable valve to a vent port of the fuel tank. In other examples, cap 202 may be configured to couple the latchable valve to a vent line coupled to a vent port of the fuel tank. Overmold 222 may be coupled to a fuel vapor canister, such as canister 22 of FIG. 1. In some examples, overmold 222 may be configured to directly couple the latchable valve to a load port of the fuel vapor canister. The load port may be coupled to a fuel vapor canister buffer, such as buffer 22a of FIG. 1. Further, the cap and overmold may be coupled to each other, e.g. mechanically, and may enclose various components of the latchable solenoid valve within. An orifice of the latchable solenoid valve may be included within cap 202 (not shown). When configured as a fuel tank isolation valve, fuel vapors from the fuel tank may flow via an orifice of the latchable solenoid valve towards the canister when the latchable solenoid valve is opened.

Latchable solenoid valve 200 includes valve shaft 212 and stator assembly 215, the stator assembly 215 comprising lower stator 214 and upper stator 218. In some examples, upper stator 218 alone may be magnetically conductive. Alternatively, each of lower stator 214 and upper stator 218 may be magnetically conductive. Stator assembly 215 also includes an electric solenoid coil (not shown) wound around bobbin 216. The electric solenoid coil may be coupled to a source of electricity such as a battery in a vehicle via the terminal wires of the coil and battery terminals 220. In the example of the emission control system of FIG. 1, the electric coil may receive voltage pulses responsive to indications from controller 12. When a voltage is applied to the electric coil, the current flowing through the coil may generate a magnetic field. When the magnetic field increases above a threshold, upper stator 218 may be magnetized and a first end 230 of valve shaft 212 may be drawn towards the upper stator 218. As such, upper stator 218 may be fitted into a bore within bobbin 216. Further, at least a first portion of valve shaft 212 may be enclosed within sleeve 228. In turn, sleeve 228 may be surrounded at least partially by each of bobbin 216 and upper stator 218.

Valve shaft 212 may have a second end 231 formed to couple to each of index 204 and latch 206. Further, index 204 may be coupled to each of poppet 224 and insert 226. As such, second end 230 of valve shaft 212 is also coupled (e.g., mechanically) to each of poppet 224 and insert 226. Further, index 204 may be positioned adjacent to and in direct contact with latch 206. Latch guide 208 may encircle each of latch 206, index 204, and at least a portion of second end 231 of valve shaft 212. A spring cup 210 may be positioned within latch guide 208 atop latch 206. Latch 206 may be in direct contact with latch guide 208. To elaborate, latch 206 may be latched onto latch guide 208. Further, latch 206 may includes one or more prongs that enable latch 206 to be latched onto latch guide 208. As such, a central axis of latch guide 208 may be the same as a central axis of latch 206, and a central axis of index 204. Further, a central axis of valve shaft 212 may be the same as the central axis of latch guide 208 and a central axis of bobbin 216. As depicted in FIG. 2, latchable solenoid valve 200 has a central axis 240. It will be appreciated that the central axis of latch guide 208, central axis of latch 206, the central axis of index 204, the central axis of valve shaft 212, and the central axis of bobbin 216 may be the same as central axis 240.

It will be noted that latch guide 208 may be fixed and may not rotate around its central axis or move axially. Conversely, latch 206 may rotate around its central axis. Prongs formed on the latch may be shifted from a first location (e.g., a latched open position) on the latch guide and repositioned in a second location (e.g., a latched closed position) on the latch guide to provide a change in position of the latchable solenoid valve. It will also be noted that poppet 224, insert 226, index 204, latch 206, and latch guide 208 may be enclosed within cap 202.

When the latchable solenoid valve is energized (specifically, when the upper stator of the latchable solenoid valve is magnetized), the valve shaft 212 is drawn towards the upper stator 218. The latchable solenoid valve may be energized for a brief duration (e.g., 100 ms) via a voltage pulse. Since the second end 231 of the valve shaft 212 is coupled to the index 204, the index 204 is simultaneously drawn in a direction towards the bobbin 216. In examples where index 204 is in direct contact with latch 206, the latch 206 may be shifted off the first location in the latch guide 208, towards the direction of the bobbin 216. When the latchable solenoid valve is de-energized at the end of the voltage pulse, the upper stator is de-magnetized and the armature is returned to its original position. At the same time, the latch may be rotated and slide into a second location on the latch guide. The first location of the latch on the latch guide may enable a latched open position of the latchable solenoid valve while the second location on the latch guide may enable a latched closed position of the latchable solenoid valve. Alternatively, the first location of the latch on the latch guide may enable the latched closed position of the latchable solenoid valve while the second location on the latch guide may enable the latched open position of the latchable solenoid valve.

In some examples, latch guide 208 may include a single location configured to engage latch 206. In such examples, valve shaft 212 may be biased in an default-open or default-closed position by a biasing spring. For example, a fuel tank isolation valve may be a default-closed valve, wherein the spring biases the valve shaft away from the upper stator in the absence of a voltage pulse. The latchable solenoid valve may be energized, whereupon valve shaft 212 moves towards upper stator 218 and latch 206 engages a location on latch guide 208, opposing the biasing spring, and allowing valve shaft 212 to remain in the open position when the solenoid coil is decoupled from the voltage source. In response to a second voltage pulse, latch 206 may disengage from latch guide 208, and the biasing spring may return valve shaft 212 to the closed position.

Latchable solenoid valves provide an advantage over non-latchable valves in that only a brief electrical pulse is required to adjust and maintain the valve's position, thus providing an energy savings when compared to valves that require a constant current supply to maintain the valve in one position. However, this requires the position of the latchable valve to be stored in memory. As such, the valve position information may become invalid or indeterminate for a number of reasons such as low battery, reflashing of the controller, memory corruption in the controller, and valve replacement. For emissions control systems, this may leave the system in an undesirable state. In order to determine the position of the valve, the valve may be actuated and a state of the fuel tank and/or emissions control system evaluated for change. However, this may take an extended period of time, adjust the valve into an undesirable position, and/or interfere with system operations while waiting for the status to be deteremined. In other examples, a dedicated position sensor may be coupled to the valve, though this may increase the cost and complexity of the valve, may require additional solenoid wiring, and may further require additional OBD testing to monitor the function of the position sensor.

FIGS. 3 and 4 schematically show an exemplary latchable valve 300 including an indicator coil that may adjust a current-voltage relationship of a circuit including the solenoid actuation coil based on valve position. Specifically, FIG. 3 shows latchable valve 300 in an open position and FIG. 4 shows latchable valve 300 in a closed position. Latchable valve 300 may be utilized as a fuel tank isolation valve, and may thus be an example of FTIV 52, as shown in FIG. 1.

Latchable valve 300 includes an actuation coil 302 at least partially surrounding a valve shaft 304. Latchable valve 300 further includes a first terminal wire 306 coupled to a first end of actuation coil 302 and a second terminal wire 308 coupled to a second end of actuation coil 302. The first 306 and second 308 terminal wires may be coupled to a positive and negative power source enabling current to be flowed through actuation coil 302. When actuation coil 302 is energized such that the magnetic field induced by current flowing through the actuation coil is above a threshold flux density, valve shaft 304 may move up or down, using similar methods described for valve shaft 212 with reference to FIG. 2. Movement of valve shaft 304 in this way thus enables an orifice 310 of the valve to be selectively opened (as shown in FIG. 3) and closed (as shown in FIG. 4) to restrict or allow the flow of fluid through a conduit 312. For example, when configured as an FTIV, closing orifice 310 may substantially inhibit the flow of fuel vapor between the fuel tank and fuel vapor canister, while opening orifice 310 may permit the flow of fuel vapor between the fuel tank and fuel vapor canister. Herein, references to opening or closing a valve, or placing a valve or valve shaft in an open or closed position indicate the closing of an orifice via movement of the valve shaft.

In some examples, a Hall Effect sensor may be positioned in the latchable valve 300. The Hall Effect sensor may be configured to indicate if the valve is in an open or closed position. However, this adds additional cost and complexity to the valve. The inherent properties of the valve components may also provide an indication of valve position. For example, the inductance of a solenoid coil is a function of the position and makeup of the core (e.g., valve shaft) within the coil. More specifically, the inductance of a coil increases directly as the permeability of the core material increases, permeability defined as a measure of the ability of a material to act as a path for additional lines of magnetic force. For example, if a coil is wound around a valve shaft comprising an iron core, the permeability of the core is very high. If the valve shaft is positioned part way out of the coil of wire, the core is part iron and part air and the permeability of the core decreases. As the permeability of the core decreases, the inductance of the coil decreases. As such, the current-voltage relationship for a given actuation coil may be observed to vary slightly depending on the state of valve shaft position (open or closed). More precisely, the coil inductance resists change in current and therefore current builds up slowly toward a steady state, the rise time constant being based on the value of the inductance. Thus monitoring current through an inductor can provide information on the inductance, the inductance directly proportional to the permeability of the core (valve shaft in an open or closed position, or in a state of changing permeability during valve shaft movement).

Under a scenario where current flowing through the actuation coil generates a magnetic field of a flux density that is below a threshold to initiate valve shaft movement, the measured current-voltage relationship may be different when the valve shaft is in an open position compared to when the valve shaft is in a closed position, for example. However, observing this difference depends on the composition of the valve shaft. In scenarios where the valve shaft has a moderate or low permeability (e.g., a cap portion of the valve shaft is conductive while the rest of the shaft is not), the coil inductance may not change significantly between the open and closed positions.

To further discern differences in the current-voltage relationship due to valve position, latchable valve 300 may be configured to couple additional components to a circuit comprising the actuation coil based on valve position, thereby adjusting the current-voltage relationship of the circuit in a predictable and significant manner. For example, a resistor may be coupled to the circuit comprising the actuation coil when the valve shaft is in a first position, but not when the valve shaft is in a second position.

For example, valve shaft 304 may include an indicator coil 315, which travels with the valve shaft when the actuation coil is energized. Indicator coil 315 may comprise a first terminus 316 and a second terminus 317 which may be exposed on the exterior of valve shaft 304, and/or coupled to electrical contacts which are exposed on the exterior of valve shaft 304. Latchable valve 300 may additionally include an indicator coil adaptor 318. Indicator coil adaptor 318 may at least partially surround the valve shaft 304 when the valve is in the closed position, as shown in FIG. 4. Indicator coil adaptor 318 may include adaptor contacts 319 and 320 configured to make contact with first terminus 316 and second terminus 317 of indicator coil 315, respectively, when the valve is in a closed position, but not when the valve is in an open position. For example, adaptor contacts 319 and 320 may comprise conductive brushes, such as metallic brushes that may establish an electrical connection with indicator coil 315 when engaged with the first and second termini.

Indicator coil adaptor 318 may further include electrical connections to one or more of the first and second terminal wires of the latchable fuel tank isolation valve. In this way, current may flow between first and second terminal wires 306 and 308 via indicator coil 315 when the valve is in a closed position, in addition to flowing through the actuation coil. When the valve shaft 304 is in an open position (FIG. 3), current may flow between the first 306 and second 308 terminal wires via the actuation coil 302 only, and no current may flow from the first 306 and second 308 terminal wires via the indicator coil 315. In some examples, indicator coil adaptor 318 may be configured to establish a first electrical connection to actuation coil 302 and a second electrical connection to second terminal wire 308 of the latchable fuel tank isolation valve. In this way, current may flow between the actuation coil 302 and the second terminal wire 308 via indicator coil 315 when the valve is in a closed position (FIG. 4), in addition to the current flow through the actuation coil 302. In the case where the valve shaft 304 is in an open position (FIG. 3), current may flow between the first 306 and second 308 terminal wires via the actuation coil 302 only, and no current may flow between adaptor contacts 319 and 320.

Monitoring the current-voltage relationship between the first and second terminal wires of the actuation coil can thus provide an indication of whether latchable valve 300 is in an open or closed position. Specifically, in some embodiments, the variation in voltage output of the valve circuit can indicate an open or closed position due to the fact that electrically connecting and disconnecting the indicator coil 315 to the circuit comprising terminal wires 306 and 308 changes the resistance in the circuit. For instance, when the circuit comprising terminal wires 306 and 308 includes the indicator coil 315, the resistance in the circuit is decreased relative to when the indicator coil is not electrically coupled to the actuation coil, as a result of the indicator coil being connected in parallel with the actuation coil within the circuit. Therefore, it will be appreciated that the output voltage in the circuit can be monitored without adjusting position of the valve shaft to determine if the latchable valve is in an open or a closed configuration.

A controller such as the controller 12, shown in FIG. 1, may be coupled to actuation coil 302 via terminal wires 306 and 308. The controller may be configured to monitor the current-voltage relationship in a circuit in the latchable valve 300. Additionally, it will be appreciated that the first terminal wire 306 and second terminal wire 308 may be energized via electrical pulses via the controller 12. Thus, the circuit may be used to monitor the valve position as well as actuate the valve. In this way, the circuit can provide a dual-functionality which increases the valves efficiency and decreases the valve's cost.

It may be further appreciated that differences in measured current-voltage relationships as a function of valve shaft position are not limited to embodiments wherein an indicator coil is coupled to the valve shaft. For example, other types of resistor may be coupled to the valve shaft in place of an indicator coil. The valve shaft may bridge an open ended circuit (such as indicator coil adaptor 318) such that an additional resistor is selectively electrically coupled to the actuation coil based on valve shaft position, although the additional resistor itself does move along with the valve shaft. In some examples, a first indicator coil or resistor may be coupled to the circuit when the valve shaft is in the open position, and a second indicator coil or resistor may be coupled to the circuit when the valve shaft is in the closed position, the first indicator coil or resistor having a different resistance than the second indicator coil or resistor. The valve shaft composition may be such that the current-voltage relationship between the first and second terminal wires is significantly different based on the valve shaft position when a current passing through the actuation coil is generating a sub-threshold magnetic field. Both terminals of an indicator coil/resistor may be electrically coupled upstream or downstream of the actuation coil, allowing the indicator coil/resistor to be electrically coupled in series with the actuation coil (e.g., via the actuation of an SPDT switch). In some examples, the indicator coil/resistor may be electrically coupled in parallel when in a first position, and electrically coupled in series when in a second position. It should be understood that other configurations that alter the current-voltage relationship between the first and second terminal wires based on the valve shaft position are within the scope of this disclosure.

FIGS. 5 and 6 show an exemplary diagram of a latchable valve circuit 500. FIG. 5 shows valve circuit 500 in an open configuration and FIG. 6 shows valve circuit 500 in a closed configuration. Valve circuit 500 may be utilized to control the position of a latchable solenoid valve 502, as well as to monitor a position of the latchable solenoid valve. Valve circuit 500 will be described with reference to controlling and monitoring the position of latchable valve 300 and components thereof in the context of a fuel tank isolation valve, though it should be understood that valve circuit 500 may be utilized in conjunction with latchable valve 300 in other configurations, and may further be applied to controlling and monitoring other valve configurations without departing from the scope of this disclosure. Valve circuit 500 may be comprised at least in part within controller 504.

Valve circuit 500 includes a first resistor 506 and a second resistor 508. For example, first resistor 506 may be an actuation coil of valve 502, such as actuation coil 302 as shown in FIGS. 3 and 4. Second resistor 508 may be an indicator coil of valve 502, such as indicator coil 315 as shown in FIGS. 3 and 4. First resistor 506 and second resistor 508 may have different resistance values of R1 and R2, respectively. Second resistor 508 is represented by a rectangle shape having a smaller area than the first resistor 506 in order to emphasize that the values of R1 and R2 may vary.

First resistor 502 includes a first terminal wire 509 and a second terminal wire 510. Second terminal wire 510 may be grounded, as illustrated. First terminal wire 509 may be selectively coupled to a primary voltage source 512 via actuation of switch 514. In one example, primary voltage source 512 may be a 12 volt power source, such as a car battery. However, power sources with alternate voltages may be used in some configurations. Switch 514 may be a field-effect transistor (FET) switch, or other appropriate type of actuatable on-off electrical switch. Switch 514 may be included in a controller, as depicted in FIGS. 5 and 6, or in other configurations, may be included in valve 502 or within another module. Switch 514 may be energized with a voltage pulse to enable current to flow from primary voltage source 512 through first resistor 506. In embodiments where first resistor 506 is configured as a solenoid coil, actuating switch 514 for a threshold duration may result in current traversing the solenoid coil such that a magnetic field is generated having a flux density that is greater than the threshold flux density necessary to adjust a position of a valve shaft located at least partially within the solenoid coil. In examples where second resistor 508 is configured to move along with a valve shaft, the position of second resistor 508 may be adjusted responsive to the solenoid coil generating a magnetic field having a flux density greater than the threshold flux density. For a latchable solenoid valve, switch 514 may be de-actuated following a predetermined duration, and/or responsive to movement of the valve shaft from a first position to a second position. Switch 514 may then be re-actuated for the threshold duration to move the valve shaft from the second position to the first position.

Valve circuit 500 may include an indicator adaptor 516. Indicator adaptor 516 may be configured to reversibly couple second resistor 508 to valve circuit 500. For example, indicator adaptor 516 may be an example of indicator coil adaptor 318 as shown in FIGS. 3 and 4. Indicator adaptor 516 includes a first adaptor contact 517 and a second adaptor contact 518. In this example, first adaptor contact 517 is coupled to first terminal wire 509 and second adaptor contact 518 is coupled to second terminal wire 510. However, as described for indicator coil adaptor 318, other configurations may be utilized. Second resistor 508 comprises a first terminus 519 and a second terminus 520. When valve 502 is in a closed conformation, as shown in FIG. 6, first terminus 519 electrically couples to first adaptor contact 517, and second terminus 520 electrically couples to second adaptor contact 518. As such, when first terminal wire 509 and second terminal wire 510 are coupled a voltage source, current will flow through both first resistor 506 and second resistor 508. However, when valve 502 is in an open conformation, as shown in FIG. 5, current will only flow through first resistor 506 when first terminal wire 509 and second terminal wire 510 is coupled to a voltage source. In this way, the current voltage relationship between first terminal wire 509 and second terminal wire 510 changes as a function of the position of valve conformation.

First terminal wire 509 may further be coupled to a monitoring wire 524. Monitoring wire 524 may electrically couple first terminal wire 509 to a secondary voltage source 525. Secondary voltage source 525 may have a lower voltage than primary voltage source 512. For example, secondary voltage source 525 may be a 5 volt source, although higher or lower voltages may be used. Secondary voltage source 525 may be configured such that coupling first terminal wire 509 to secondary voltage source 525 results in current flowing through first resistor 506 that produces a magnetic field with a flux density below the threshold required to actuate a valve shaft when first resistor 506 is configured as a solenoid (actuation) coil. Monitoring wire 524 may be selectively coupled to secondary voltage source 525 via monitoring switch 526. Monitoring switch 526 may be a FET switch, or other suitable on-off switch, and may be energized with voltage pulses. Further, a third resistor 527 may be electrically coupled between secondary voltage source 525 and monitoring wire 524. In some examples, third resistor 527 may be a high-resistance pull up resistor, although other types of resistors may also be used. As shown in FIGS. 5 and 6, secondary voltage source 525, monitoring switch 526, and third resistor 527 are included in controller 505, though other configurations are possible.

The current-voltage relationship between first terminal wire 509 and second terminal wire 510 may be monitored at output voltage node 528. For example, output voltage node 528 may be electrically coupled to first terminal wire 509 as shown, and may further be coupled to ground (not shown), and thus be configured to indicate a voltage drop across first resistor 506. In some examples, controller 504 may sample output voltage node 508 responsive to an indication to determine the status of valve 502. For example, the status of valve 502 may become indeterminate following a reflashing of memory of controller 504. In other examples, controller 504 may continuously sample output voltage node 508, or may sample output voltage node 508 only when monitoring switch 526 is energized, thus coupling secondary voltage source 525 to first terminal wire 509. Controller 504 may be configured with instructions stored in non-transitory memory that when executed, cause the controller to indicate the position of valve 502 based on a steady-state current-voltage relationship between first terminal wire 509 and second terminal wire 510. In other words, transient changes in current-voltage relationship may not be used to indicate the position of valve 502. For example, upon energizing monitoring switch 526, the voltage at output voltage node 508 may experience a period of stabilization prior to reaching a steady-state voltage. Such an example is described with regard to FIG. 9.

FIG. 5 shows first resistor 506 electrically disconnected from the second resistor 508 (open position). Thus, current may be confined to flow through only the first resistor 506 in circuit 500 when monitoring switch 526 is energized. The steady-state voltage output for valve circuit 500 in this conformation may thus be given by the following equation:

$$V\text{out}=5*[R1]/[R1+R3]$$

FIG. 6 shows the first resistor 506 having an electrical connection with the second resistor 508 via indicator adaptor 516. Thus, current may flow through both first resistor 506 and second resistor 508 in circuit 500 when monitoring switch 526 is energized. The steady-state voltage output for valve circuit 500 in this conformation may thus be given by the following equation:

$$V\text{out}=5*[\text{Req}]/[\text{Req}+R3]$$

where $$\text{Req}=[R1*R2]/[R1+R2].$$

Therefore, it will be appreciated that the voltage at voltage output node 528 of valve circuit 500 may be monitored to determine the configuration of the valve. For example, if the output voltage is above a threshold value it can be ascertained that the valve is in an open position. However, if the output voltage is below a threshold value it can be ascertained that the valve is in a closed position. For this binary logic to hold, the resistances for first resistor 506 and second resistor 508 may be chosen such that R1 and R2 are within a threshold of each other. If R1 and R2 are significantly different, the equivalent resistance may approach the smaller value of the two, thus decreasing the signal-to-noise ratio for determining whether the resistors are in series or parallel conformation. The greatest signal-to-noise ratio may be experienced in configurations where R1=R2.

FIG. 7 shows a flow chart for an example high-level method 700 for operation of an emission control system. Specifically, method 700 provides an example means for determining the position of a fuel tank isolation valve, and adjusting emission control system operation accordingly. Method 700 will be described with reference to the systems described herein and depicted in FIGS. 1-6, but it should be understood that method 700 and similar methods may be applied to other systems without departing from the scope of the disclosure. Instructions for carrying out method 700 and the rest of the methods included herein may be executed by a controller based on instructions stored in non-transitory memory of the controller and in conjunction with signals received from sensors of the emission control system, such as the sensors described above with reference to FIG. 1. The controller may employ actuators of the emission control system to adjust emission control system operation, according to the methods described below.

Method 700 begins at 710. At 710, method 700 includes evaluating operating conditions. Operating conditions may be measured, estimated or inferred, and may include various vehicle conditions, such as vehicle speed and vehicle location, various engine operating conditions, such as engine operating mode, engine speed, engine temperature, exhaust temperature, boost level, MAP, MAF, torque demand, horsepower demand, etc., and various ambient conditions, such as temperature, barometric pressure, humidity, etc.

Continuing at 720, method 700 includes maintaining the position of a latchable fuel tank isolation valve. For example, a controller may not apply a voltage to the actuation coil of the latchable FTIV that is capable of generating an electric field with a magnetic flux density greater than the threshold required to move a valve shaft disposed at least partially within the solenoid coil. At 730, method 700 includes determining a current-voltage relationship of a circuit comprising the actuation coil of the latchable FTIV without actuating the valve. For example, as shown in FIGS. 5 and 6, the actuation coil may be electrically coupled to a secondary voltage source such that a voltage drop between the first and second terminal wires of the actuation coil may be monitored at a voltage output node without the actuation coil generating an electric field with a magnetic flux density greater than the threshold required to move the valve shaft and thus actuate the valve. The current-voltage relationship may be a steady-state current-voltage relationship.

At 740, method 700 includes indicating a position of the valve shaft of the latchable FTIV based on the determined current-voltage relationship. For example, as shown in FIGS. 3 and 4, the latchable FTIV may comprise an indicator coil configured to move responsive to valve shaft movement. As such, the valve shaft may be indicated to be in the open position responsive to a determined current-voltage relationship representative of current traversing the actuation coil but not the indicator coil, and the valve shaft may be indicated to be in the closed position responsive to a determined current-voltage relationship representative of current traversing the actuation coil and the indicator coil. As described with regards to FIGS. 5 and 6, an open valve position may be indicated by an output voltage above a threshold, while an output voltage below the threshold may be indicative of the valve in a closed position.

At 750, method 700 includes determining whether the valve shaft has been indicated to be in the open position. If the valve shaft is in an open position, method 700 proceeds to 760. At 760, method 700 includes adjusting emissions control system operation based on the valve shaft being in the open position. For example, a canister load may be updated to reflect that the FTIV was open, thus allowing flow of fuel vapor between the fuel tank and fuel vapor canister. A canister purge schedule may then be updated based on the updated canister load. Method 700 may then end.

If the valve shaft is determined to be in a closed position, method 700 proceeds to 770.

At 770, method 700 includes adjusting emissions control system operation based on the valve shaft being in the closed position. For example, diagnostic codes indicating a blockage between the fuel tank and the fuel vapor canister may be cleared, and OBD testing schedules for the emissions control system updated accordingly. Method 700 may then end.

FIG. 8 shows a flow chart for an example high-level method 800 for operation of a fuel system. Specifically, method 800 provides an example means for determining the position of a fuel tank isolation valve, and adjusting fuel system operation accordingly. Method 800 will be described with reference to the systems described herein and depicted in FIGS. 1-6, but it should be understood that method 800 and similar methods may be applied to other systems without departing from the scope of the disclosure. Instructions for carrying out method 800 and the rest of the methods included herein may be executed by a controller based on instructions stored in non-transitory memory of the controller and in conjunction with signals received from sensors of the emission control system, such as the sensors described above with reference to FIG. 1. The controller may employ actuators of the emission control system to adjust emission control system operation, according to the methods described below.

Method 800 begins at 805. At 805, method 800 includes evaluating operating conditions. Operating conditions may be measured, estimated or inferred, and may include various vehicle conditions, such as vehicle speed and vehicle location, various engine operating conditions, such as engine operating mode, engine speed, engine temperature, exhaust temperature, boost level, MAP, MAF, torque demand, horsepower demand, etc., and various ambient conditions, such as temperature, barometric pressure, humidity, etc.

At 810, method 800 may include determining whether the position of a fuel tank isolation valve shaft is known. For example, the memory of a controller may be accessed to determine whether a current position is stored. If the position of the FTIV valve shaft is known, method 800 proceeds to 815. At 815, method 800 includes maintaining the position of the FTIV valve shaft. Method 800 may then end.

If the position of the FTIV valve shaft is not known, method 800 proceeds to 820. At 820, method 800 includes maintaining the position of a latchable fuel tank isolation valve. For example, a controller may not apply a voltage to the actuation coil of the FTIV that is capable of generating an electric field with a magnetic flux density greater than the threshold required to move the FTIV valve shaft. At 825, method 800 includes determining a current-voltage relationship of a circuit comprising the actuation coil of the latchable FTIV without actuating the valve. As described herein, the actuation coil may be electrically coupled to a secondary voltage source (e.g., secondary voltage source 525 without actuating the valve. The current-voltage relationship may be determined based on a steady-state voltage drop across the first and second terminal wires of the actuation coil, the magnitude of the steady-state voltage drop indicative of whether an indicator coil is electrically coupled to the actuation coil, and thus indicative of the position of the valve shaft.

Continuing at 830, method 800 may include determining whether the FTIV is in a desired position. The desired position of the FTIV may be based on current operating conditions. For example, if a refueling event is imminent, the desired position may be an open position. In other examples, such as during engine operation, the desired position of the FTIV may be a closed position. If the FTIV is in the desired position, method 800 proceeds to 835. At

835, method 800 includes maintaining the FTIV position. Continuing at 840, method 800 includes adjusting fuel system operation based on the valve shaft position. For example, if the FTIV is in the closed position, the fuel tank pressure may be monitored to determine if the fuel tank needs to be vented, and the FTIV opened to depressurize the fuel tank if the fuel tank pressure is above a threshold. Method 800 may then end.

Returning to 830, if the fuel tank isolation valve is not in the desired position, method 800 may proceed to 845. At 845, method 800 includes adjusting the position of the FTIV. For example, a controller may apply a voltage to the actuation coil of the latchable FTIV that is capable of generating an electric field with a magnetic flux density greater than the threshold required to move a valve shaft disposed at least partially within the solenoid coil. Upon the valve shaft position adjusting, the voltage source may be decoupled from the actuation coil.

Continuing at 850, method 800 includes adjusting fuel system operation based on the valve shaft position. For example, if the valve shaft was closed from an open conformation, the fuel vapor canister load may be updated to reflect that fuel vapor was flowed between the fuel tank and fuel vapor canister. The controller may estimate a duration that the FTIV was in an undesired position based on operating condition history, and update canister load and other fuel system parameters accordingly. If the canister load is updated, a canister purge schedule may be updated accordingly. Method 800 may then end.

FIG. 9 shows an example timeline 900 for determining the position of a valve shaft in a fuel tank isolation valve using the methods described herein and with regards to FIGS. 7 and 8, as applied to the systems described herein and with regards to FIGS. 1-6. Timeline 900 includes plot 901, indicating the position of a valve shaft over time; plot 902 indicating an energization state of a first transistor (FET1) coupled between an actuation coil and a primary voltage source over time; and plot 903, indicating an energization state of a second transistor (FET2) coupled between the actuation coil and a secondary voltage source over time. Timeline 900 further includes plot 904 indicating a measured output voltage. Line 905 indicates a threshold voltage, above which an open valve shaft position is indicated, and below which indicates a closed valve shaft position. Timeline 900 further includes plot 906 indicating magnetic flux density induced by current in the actuation coil. Line 907 indicates a threshold flux density, above which movement of the valve shaft is initiated, and below which valve shaft movement is not initiated. Timeline 900 further includes plot 908, indicating whether a position determination of the valve shaft is required over time; and plot 909, indicating whether a change in position of the valve shaft is required over time.

At time $t_0$, the fuel tank isolation valve is in a static state. In this example, the fuel tank isolation valve shaft is positioned in an open state at time $t_0$, as indicated by plot 901. Neither FET1 nor FET 2 is energized, as indicated by plots 902 and 903, respectively. Accordingly, Vout is zero, as indicated by plot 904, and the flux density induced by current in the actuation coil is zero, as indicated by plot 906.

At time $t_1$, a valve shaft position determination request is initiated, as shown by plot 908. Accordingly, FET2 is energized resulting in a steady state current that induces a magnetic flux density below the threshold represented by line 907, such that the valve shaft position is not changed but an output voltage may be determined. The steady-state voltage at Vout is greater than the threshold represented by line 905, as the valve shaft is in the open position, and thus an indicator coil is not electrically coupled to the actuation coil.

Position determination 908 is terminated at time $t_2$ via de-energization of FET2. Accordingly, Vout and the actuation coil induced flux density decay to zero. However, a valve shaft position change is required, as shown by plot 909, indicating that the desired valve position is a closed position. Accordingly, a valve shaft position change is initiated at $t_3$ whereby FET1 is energized such that the actuation coil current induces a magnetic field of a flux density greater than threshold 907. In this example, Vout is not monitored during the actuation of FET1, though a change in voltage drop may be recognized at an output voltage node. At time $t_4$, the valve shaft changes from an open position to a closed position. Valve shaft position changing is thus terminated at time $t_5$ via de-energization of FET1. Accordingly, the actuation coil induced flux density decays to zero.

At time $t_6$, position determination is again indicated, to confirm that the valve shaft remains in the desired, closed position. Accordingly, FET2 is energized resulting in a steady state current that induces a magnetic flux density below the threshold represented by line 907. The steady-state voltage at Vout is below the threshold represented by line 905, as the valve shaft is in the closed position, and thus the indicator coil is electrically coupled in parallel to the actuation coil. Position determination is terminated at time $t_7$ via de-energization of FET2. Accordingly, Vout and the actuation coil induced flux density decay to zero.

The systems described herein and with regards to FIGS. 1-6, as well as the methods described herein and with reference to FIGS. 7-8 may enable one or more systems and one or more methods. In one example a fuel system is presented, the fuel system comprising a fuel tank isolation valve coupled between a fuel tank and a fuel vapor canister, the fuel tank isolation valve comprising an actuation coil comprising a first terminal wire and a second terminal wire, the actuation coil configured to generate a magnetic field when the first and second terminal wires are switchably connected to an actuating voltage source, and a valve shaft at least partially disposed within the actuation coil, the valve shaft configured to change between an open position and a closed position in response to the actuation coil generating a magnetic field having a flux density above a threshold, wherein the valve shaft is configured to alternately latch in the open and closed positions such that the valve shaft is maintained in a latched-open or latched-closed position when the actuation coil is generating a magnetic field having a flux density below the threshold, and wherein the fuel tank and the fuel vapor canister are fluidically coupled when the valve shaft is in the open position but not when the valve shaft is in the closed position; and a controller configured to indicate a position of the valve shaft based on a measured current-voltage relationship between the first and second terminal wires during a condition in which the magnetic field generated by actuation coil current has a flux density below the threshold. In this way, the position of a latchable valve may be determined without adjusting the position of the valve. In such an embodiment of a fuel system, the measured current-voltage relationship may additionally or alternatively be based at least in part on a steady-state voltage drop between the first and second terminal wires. In any of the preceding embodiments of a fuel system, the fuel tank isolation valve may additionally or alternatively comprise a monitoring wire electrically coupled between the actuation coil and a secondary voltage source, the secondary voltage source having an output voltage that is insufficient to cause the actuation coil to generate a magnetic field having a flux density above the threshold. In any of the preceding embodiments of a fuel system comprising a monitoring wire electrically coupled between the actuation coil and a secondary voltage source, the controller may additionally or alternatively be configured to indicate a position of the valve shaft based on the measured current-voltage relationship between the first terminal wire and the second terminal wire when current is being applied from the secondary voltage source to the actuation coil via the monitoring wire. In any of the preceding embodiments of a fuel system, the fuel tank isolation valve may additionally or alternatively comprise an indicator coil configured to travel with the valve shaft as the valve shaft moves between the open and closed positions. In any of the preceding embodiments of a fuel system comprising an indicator coil, electrical contact may additionally or alternatively be reversibly established between the actuation coil and the indicator coil when the valve shaft is latched in one of the open position and the closed position. In any of the preceding embodiments of a fuel system where electrical contact is established between the actuation coil and the indicator coil when the valve shaft is latched in one of the open position and the closed position, establishing electrical contact between the actuation coil and the indicator coil may additionally or alternatively result in a circuit wherein the actuation coil and the indicator coil are coupled in parallel. In any of the preceding embodiments of a fuel system comprising an indicator coil the fuel tank isolation valve may additionally or alternatively comprise an indicator adaptor electrically coupled to one or more of the first terminal wire and the second terminal wire, the indicator adaptor comprising a first receiving contact and a second receiving contact such that the first receiving contact electrically couples to a first terminal of the indicator coil and the second receiving contact electrically couples to a second terminal of the indicator coil to establish electrical contact between the actuation coil and the indicator coil. In any of the preceding embodiments of a fuel system comprising an indicator adaptor comprising a first receiving contact and a second receiving contact, the first receiving contact and the second receiving contact may additionally or alternatively comprise metallic brushes. In any of the preceding embodiments of a fuel system where electrical contact is established between the actuation coil and the indicator coil when the valve shaft is latched in one of the open position and the closed position, the actuation coil and indicator coil may additionally or alternatively be in electrical contact only when the valve shaft is in the closed position. In any of the preceding embodiments of a fuel system where electrical contact is established between the actuation coil and the indicator coil only when the valve shaft is in the closed position, the controller may additionally or alternatively be further configured to indicate that the valve shaft is in the open position responsive to a measured current-voltage relationship representative of current traversing the actuator coil but not the indicator coil. In any of the preceding embodiments of a fuel system where electrical contact is established between the actuation coil and the indicator coil only when the valve shaft is in the closed position, the controller may additionally or alternatively be further configured to indicate that the valve shaft is in the closed position responsive to a measured current-voltage relationship representative of current traversing both the actuator coil and the indicator coil. In any of the preceding embodiments of a fuel system, the fuel tank isolation valve may additionally or alternatively comprise an orifice positioned to allow fuel vapor to flow through the fuel tank isolation valve when the valve shaft is in the open position, but not the closed position, an overmold configured to directly couple the fuel tank isolation valve to a load port of a fuel vapor canister, and a cap configured to couple the fuel tank isolation valve to a fuel tank vent line. In any of the preceding embodiments of a fuel system, the controller may additionally or alternatively be configured to switchably connect the first and second terminal wires to the actuating voltage source responsive to an indication to adjust fuel vapor flow through the orifice, switchably connect the first and second terminal wires to the actuating voltage source responsive to an indication that a current valve shaft position is not a desired valve shaft position, switchably connect the first and second terminal wires to the actuating voltage source so as to move the valve shaft to the open position from the closed position responsive to an indication that the fuel system is entering a fuel vapor storage mode; and switchably connect the first and second terminal wires to the actuating voltage source so as to move the valve shaft to the closed position from the open position responsive to an indication that the fuel system is exiting the fuel vapor storage mode. In another representation, a pullup resistor may additionally or alternatively be electrically coupled between the actuation coil and the secondary voltage source. In embodiments of a fuel system comprising a pullup resistor electrically coupled between the actuation coil and the secondary voltage source, the pullup resistor may comprise a resistance greater than the resistance of the actuation coil when the actuation coil is generating a magnetic field with a flux density less than the threshold, and may further comprise a resistance greater than the resistance of the indicator coil. In another representation of a fuel system, a transistor may additionally or alternatively be coupled between the secondary voltage source and the monitoring wire. The technical result of implementing this fuel system is that the position of a latchable fuel tank isolation valve may be determined without actuating the valve shaft. In this way, the controller that loses the positon of the valve may quickly determine the position without exacting additional configuration changes on the fuel system.

In another example, a method for an evaporative emissions system is provided, the method comprising determining a current-voltage relationship of a circuit comprising a first terminal wire and a second terminal wire of an actuation coil of a latchable fuel tank isolation valve when the valve shaft is latched in a closed position or an open position, indicating a position of a valve shaft of the latchable fuel tank isolation valve based on the determined current-voltage relationship, the valve shaft at least partially disposed within the actuation coil and configured to change between an open and closed position in response to the actuation coil generating a magnetic field with flux density above a threshold, and adjusting operation of the evaporative emissions system based on a position of the valve shaft. In this way, if the position of the valve becomes indeterminate, the evaporative emissions system may determine the actual position of the valve and adjust operations accordingly. In any of the preceding embodiments of a method for an evaporative emissions system, the latchable fuel tank isolation valve may additionally or alternatively comprise an indicator coil configured to travel with the valve shaft as the valve shaft moves between the open and closed positions, such that the circuit comprises the indicator coil in parallel with the actuator coil when the valve shaft is in the closed position, but not when the valve shaft is in the open position. In any of the preceding embodiments of a method for an evaporative emissions system where the latchable fuel tank isolation valve comprises an indicator coil, the method may additionally or alternatively comprise indicating that the valve shaft is in the open position responsive to a determined current-voltage relationship representative of current traversing the actuator coil but not the indicator coil, and indicating that the valve shaft is in the closed position responsive to a determined current-voltage relationship representative of current traversing both the actuator coil and the indicator coil. In any of the preceding embodiments of a method for an evaporative emissions system adjusting operation of the evaporative emissions control system based on a position of the valve shaft may additionally or alternatively comprise updating a canister load based on the position of the valve shaft; and adjusting a canister purge schedule based on the updated canister load. The technical result of implementing this method is a reduction in evaporative emissions resulting from the position of a fuel tank isolation valve becoming indeterminate. In this way, the position may be determined, and fuel vapor trafficking between the fuel tank and fuel vapor canister during the period of indetermination may be accounted for.

In yet another example, a method for a fuel system is provided, the method comprising during a first condition, comprising an indication that the position of a latchable fuel tank isolation valve is indeterminate, determining whether the latchable fuel tank isolation valve is in an open position or a closed position by monitoring a current-voltage relationship of a circuit comprising a first terminal wire and a second terminal wire of an actuation coil of the latchable fuel tank isolation valve when the actuation coil is electrically coupled to a voltage source such that the current traversing the actuation coil induces a magnetic field having a flux density below a threshold required to change a position of a latchable valve shaft at least partially disposed within the actuation coil, and responsive to an indication that a determined position of the latchable fuel tank isolation valve is different than a desired position, adjusting the position of the latchable valve shaft by coupling a voltage source to the actuation coil such that the current traversing the actuation coil induces a magnetic field with a flux density above the threshold required to move the latchable valve shaft. In this way, the fuel system may determine the position of a latchable fuel tank isolation valve without opening or closing the fuel tank isolation valve. In such an embodiment of a method for a fuel system, the method may additionally or alternatively comprise, responsive to the indication that a determined position of the latchable fuel tank isolation valve is different than a desired position of the latchable fuel tank isolation valve adjusting operation of the fuel system based on a fuel system operation history over a duration wherein the position of the latchable fuel tank isolation valve was indeterminate. In any of the preceding embodiments of a method for a fuel system, the method may additionally or alternatively comprise during a second condition, following adjusting the position of the latchable valve shaft, determining whether the latchable fuel tank isolation valve is in the desired position by electrically coupling the actuation coil to the voltage source such that the current traversing the actuation coil induces a magnetic field having a flux density below the threshold and monitoring the current-voltage relationship of the circuit, and indicating degradation of the fuel tank isolation valve responsive to an indication that the latchable valve shaft is not in the desired position. The technical result of implementing this method for a fuel system is an increase in robustness of leak tests applied to the fuel system. By determining the position of the fuel tank isolation valve with this method, the fuel system operation history over a duration wherein the position of the latchable fuel tank isolation valve was indeterminate may be accounted for in setting leak test parameters.

In another representation, a latchable solenoid valve is provided, the latchable solenoid valve comprising an actuation coil, a valve shaft at least partially disposed within the actuation coil; and an indicator coil configured to travel with the valve shaft as the valve shaft moves between an open position and a closed position, wherein electrical contact is reversibly established between the actuation coil and the indicator coil when the valve shaft is latched in one of the open position and the closed position. In this way, the position of a latchable solenoid valve may be determined based on a change in an electrical circuit comprising the actuation coil. In such an embodiment of a latchable solenoid valve, establishing electrical contact between the actuation coil and the indicator coil may additionally or alternatively result in a circuit wherein the actuation coil and the indicator coil are coupled in parallel. In any of the preceding embodiments of a latchable solenoid valve, the actuation coil may additionally or alternatively comprises a first terminal wire and a second terminal wire, the actuation coil may additionally or alternatively be configured to generate a magnetic field above a threshold require to change the valve shaft position between the open position and the closed position when the first and second terminal wires are switchably connected to an actuating voltage source, and the actuation coil may additionally or alternatively be configured to generate a magnetic field below the threshold require to change the valve shaft position between the open position and the closed position when the first and second terminal wires are switchably connected to a secondary voltage source. In any of the preceding embodiments of a latchable solenoid valve, wherein the actuation coil comprises a first terminal wire and a second terminal wire, the latchable solenoid valve may additionally or alternatively comprise an indicator adaptor electrically coupled to one or more of the first terminal wire and the second terminal wire, the indicator adaptor comprising a first receiving contact and a second receiving contact such that the first receiving contact electrically couples to a first terminal of the indicator coil and the second receiving contact electrically couples to a second terminal of the indicator coil to establish electrical contact between the actuation coil and the indicator coil. In any of the preceding embodiments of a latchable solenoid valve comprising an indicator coil comprising a first receiving contact and a second receiving contact, the first receiving contact and the second receiving contact may additionally or alternatively comprise metallic brushes. In any of the preceding embodiments of a latchable solenoid valve comprising an indicator coil, the actuation coil and indicator coil may additionally or alternatively be in electrical contact only when the valve shaft is in the closed position. In any of the preceding embodiments of a latchable solenoid valve wherein the actuation coil and indicator coil are in electrical contact only when the valve shaft is in the closed position, coupling the first and second terminal wires to the secondary voltage source may additionally or alternatively result in current traversing the actuator coil but not the indicator coil when the valve shaft is in the open position. In any of the preceding embodiments of a latchable solenoid valve wherein the actuation coil and indicator coil are in electrical contact only when the valve shaft is in the closed position, coupling the first and second terminal wires to the secondary voltage source may additionally or alternatively result in current traversing both the actuator coil and the indicator coil when the valve shaft is in the closed position. In any of the preceding embodiments of a latchable solenoid valve comprising a secondary voltage source, the latchable solenoid valve may additionally or alternatively comprise a monitoring wire coupled between the first terminal wire and the secondary voltage source. In any of the preceding embodiments of a latchable solenoid valve comprising a monitoring wire, the latchable solenoid valve may additionally or alternatively comprise an energizable transistor switch coupled between the monitoring wire and the secondary voltage source. In any of the preceding embodiments of a latchable solenoid valve comprising a monitoring wire, the latchable solenoid valve may additionally or alternatively comprise a pullup resistor coupled between the monitoring wire and the secondary voltage source. In any of the preceding embodiments of a latchable solenoid valve comprising a pullup resistor, the pullup resistor may additionally or alternatively comprise a resistance greater than the resistance of the actuation coil when the actuation coil is generating a magnetic field with a flux density less than the threshold, and further comprises a resistance greater than the resistance of the indicator coil. The technical result of implementing this latchable fuel tank isolation valve is that the position of the valve may be determined by monitoring a voltage drop across the actuation coil without energizing the actuation coil and without requiring additional sensors or more than two terminal wires to be coupled to the actuation coil.

In yet another representation, a method for operating an evaporative emission system is provided, the method comprising electrically coupling an actuation coil of a latchable fuel tank isolation valve to a voltage source such that the current traversing the actuation coil induces a magnetic field having a flux density below a threshold required to change a position of a latchable valve shaft at least partially disposed within the actuation coil, determining whether the latchable valve shaft is in an open position or a closed position by monitoring a steady-state voltage drop across the actuation coil, and adjusting operation of the evaporative emissions system based on a position of the latchable valve shaft. The technical result of implementing such a method is method is a reduction in evaporative emissions resulting from the position of a fuel tank isolation valve becoming indeterminate. In this way, the position may be determined, and fuel vapor trafficking between the fuel tank and fuel vapor canister during the period of indetermination may be accounted for. In such a method for an evaporative emissions system, the latchable fuel tank isolation valve may additionally or alternatively comprise an indicator coil configured to travel with the valve shaft as the valve shaft moves between the open and closed positions, such that the indicator coil is electrically coupled in parallel with the actuator coil when the valve shaft is in the closed position, but not when the valve shaft is in the open position. In any of the preceding embodiments of a method for an evaporative emissions system wherein the latchable fuel tank isolation valve comprises an indicator coil electrically coupled in parallel with the actuator coil when the valve shaft is in the closed position, but not when the valve shaft is in the open position, the method may additionally or alternatively comprise indicating that the valve shaft is in the open position responsive to a steady-state voltage drop representative of current traversing the actuator coil but not the indicator coil, and indicating that the valve shaft is in the closed position responsive to a steady-state voltage drop representative of current traversing both the actuator coil and the indicator coil. In any of the preceding embodiments of a method for an evaporative emissions system, adjusting operation of the evaporative emissions system based on a position of the valve shaft may additionally or alternatively comprise updating a canister load based on the position of the valve shaft, and adjusting a canister purge schedule based on the updated canister load.

In still another representation, a method for operating a fuel system is provided, the method comprising during a first condition, comprising an indication that the position of a latchable fuel tank isolation valve is indeterminate, electrically coupling an actuation coil of the latchable fuel tank isolation valve to a voltage source such that the current traversing the actuation coil induces a magnetic field having a flux density below a threshold required to change a position of a latchable valve shaft at least partially disposed within the actuation coil determining whether the latchable fuel tank isolation valve is in an open position or a closed position by monitoring a steady-state voltage drop across the actuation coil, and responsive to an indication that a determined position of the latchable fuel tank isolation valve is different than a desired position, adjusting the position of the latchable valve shaft by coupling a voltage source to the actuation coil such that the current traversing the actuation coil induces a magnetic field with a flux density above the threshold required to move the latchable valve shaft. The technical result of implementing this method for a fuel system is an increase in robustness of leak tests applied to the fuel system. By determining the position of the fuel tank isolation valve with this method, the fuel system operation history over a duration wherein the position of the latchable fuel tank isolation valve was indeterminate may be accounted for in setting leak test parameters. In such a method for operating a fuel system, determining whether the latchable fuel tank isolation valve is in an open position or a closed position by monitoring a steady-state voltage drop across the actuation coil may additionally or alternatively comprise determining an open position of the valve responsive to a steady-state voltage drop across the actuation coil indicative of current flowing through the actuation coil but not an indicator coil coupled to the latchable valve shaft, and determining a closed position of the valve responsive to a steady-state voltage drop across the actuation coil indicative of current flowing through both the actuation coil and the indicator coil. In any of the preceding embodiments of a method for operating a fuel system, the method may additionally or alternatively comprise, responsive to the indication that a determined position of the latchable fuel tank isolation valve is different than a desired position of the latchable fuel tank isolation valve, and adjusting operation of the fuel system based on a fuel system operation history over a duration wherein the position of the latchable fuel tank isolation valve was indeterminate. In any of the preceding embodiments of a method for operating a fuel system, the method may additionally or alternatively comprise during a second condition, following adjusting the position of the latchable valve shaft, determining whether the latchable fuel tank isolation valve is in the desired position by electrically coupling the actuation coil to the voltage source such that the current traversing the actuation coil induces a magnetic field having a flux density below the threshold and monitoring the current-voltage relationship of the circuit, and indicating degradation of the fuel tank isolation valve responsive to an indication that the latchable valve shaft is not in the desired position.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. As another example, the coolant level monitoring after engine shutdown may be in addition to coolant level monitoring techniques that are carried out and/or based on information during engine running and combusting conditions, such as engine coolant temperature measurements, knock feedback, and/or combinations thereof. In addition, the coolant temperature profile may include sampled coolant temperature at a multitude of sample times determined based on an expected exponential decay of coolant temperature toward ambient temperature. The subject matter of the present disclosure includes all novel and non-obvious combinations and subcombinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A fuel system, comprising:
a fuel tank isolation valve coupled between a fuel tank and a fuel vapor canister, the fuel tank isolation valve comprising:
an actuation coil comprising a first terminal wire and a second terminal wire, the actuation coil configured to generate a magnetic field when the first and second terminal wires are switchably connected to an actuating voltage source;
a valve shaft at least partially disposed within the actuation coil, the valve shaft configured to change between an open position and a closed position in response to the actuation coil generating a magnetic field having a flux density above a threshold, wherein the valve shaft is configured to alternately latch in the open and closed positions such that the valve shaft is maintained in a latched-open or latched-closed position when the actuation coil is generating a magnetic field having a flux density below the threshold, and wherein the fuel tank and the fuel vapor canister are fluidically coupled when the valve shaft is in the open position but not when the valve shaft is in the closed position;
an indicator coil configured to travel with the valve shaft as the valve shaft moves between the open and the closed positions; and
an electrical contact reversibly established between the actuation coil and the indicator coil when the valve shaft is latched in one of the open position and the closed position; and
a controller configured to indicate a position of the valve shaft based on a measured current-voltage relationship between the first and second terminal wires during a condition in which a magnetic field generated by actuation coil current has a flux density below the threshold.

2. The fuel system of claim 1, wherein the measured current-voltage relationship is based at least in part on a steady-state voltage drop between the first and second terminal wires.

3. The fuel system of claim 1, wherein the fuel tank isolation valve further comprises:
a monitoring wire electrically coupled between the actuation coil and a secondary voltage source, the secondary voltage source having an output voltage that is insufficient to cause the actuation coil to generate a magnetic field having a flux density above the threshold.

4. The fuel system of claim 3, wherein the controller is configured to indicate a position of the valve shaft based on the measured current-voltage relationship between the first terminal wire and the second terminal wire when current is being applied from the secondary voltage source to the actuation coil via the monitoring wire.

5. The fuel system of claim 1, wherein establishing electrical contact between the actuation coil and the indicator coil yields a circuit wherein the actuation coil and the indicator coil are electrically coupled in parallel.

6. The fuel system of claim 1, wherein the fuel tank isolation valve further comprises an indicator adaptor electrically coupled to one or more of the first terminal wire and the second terminal wire, the indicator adaptor comprising a first receiving contact and a second receiving contact such that the first receiving contact electrically couples to a first terminal of the indicator coil and the second receiving contact electrically couples to a second terminal of the indicator coil to establish electrical contact between the actuation coil and the indicator coil.

7. The fuel system of claim 6, wherein the first receiving contact and the second receiving contact comprise metallic brushes.

8. The fuel system of claim 5, wherein the actuation coil and the indicator coil are in electrical contact only when the valve shaft is in the closed position.

9. The fuel system of claim 1, wherein the controller is further configured to indicate that the valve shaft is in the open position responsive to a measured current-voltage relationship representative of current traversing the actuation coil but not the indicator coil.

10. The fuel system of claim 1, wherein the controller is further configured to indicate that the valve shaft is in the closed position responsive to a measured current-voltage relationship representative of current traversing both the actuation coil and the indicator coil.

11. The fuel system of claim 1, wherein the fuel tank isolation valve further comprises:
an orifice positioned to allow fuel vapor to flow through the fuel tank isolation valve when the valve shaft is in the open position, but not the closed position;
an overmold configured to directly couple the fuel tank isolation valve to a load port of a fuel vapor canister; and
a cap configured to couple the fuel tank isolation valve to a fuel tank vent line; and wherein the controller is further configured to:
switchably connect the first and second terminal wires to the actuating voltage source responsive to an indication to adjust fuel vapor flow through the orifice;
switchably connect the first and second terminal wires to the actuating voltage source responsive to an indication that a current valve shaft position is not a desired valve shaft position;
switchably connect the first and second terminal wires to the actuating voltage source so as to move the valve shaft to the open position from the closed position responsive to an indication that the fuel system is entering a fuel vapor storage mode; and
switchably connect the first and second terminal wires to the actuating voltage source so as to move the valve shaft to the closed position from the open position responsive to an indication that the fuel system is exiting the fuel vapor storage mode.

12. A method for an evaporative emissions system, comprising:
determining a current-voltage relationship of a circuit comprising a first terminal wire and a second terminal wire of an actuation coil of a latchable fuel tank isolation valve in a steady-state position;
indicating a position of a valve shaft of the latchable fuel tank isolation valve based on the determined current-voltage relationship, the valve shaft at least partially disposed within the actuation coil and configured to move between an open position and a closed position in response to the actuation coil generating a magnetic field with flux density above a threshold, the valve shaft moving between the open and closed positions with an indicator coil configured to travel with the valve shaft, such that the circuit includes the indicator coil in parallel with the actuation coil when the valve shaft is in the closed position, but not when the valve shaft is in the open position; and
adjusting operation of the evaporative emissions system based on a position of the valve shaft.

13. The method of claim 12, further comprising:
indicating that the valve shaft is in the open position responsive to a determined current-voltage relationship representative of current traversing the actuation coil but not the indicator coil; and
indicating that the valve shaft is in the closed position responsive to a determined current-voltage relationship representative of current traversing both the actuation coil and the indicator coil.

14. The method of claim 12, wherein adjusting operation of the evaporative emissions system based on a position of the valve shaft comprises:
updating a canister load based on the position of the valve shaft; and
adjusting a canister purge schedule based on the updated canister load.

15. A method for a fuel system, comprising:
during a first condition, comprising an indication that a position of a latchable fuel tank isolation valve is indeterminate, determining whether the latchable fuel tank isolation valve is in an open position or a closed position by monitoring a current-voltage relationship of a circuit comprising a first terminal wire and a second terminal wire of an actuation coil of the latchable fuel tank isolation valve when the actuation coil is electrically coupled to a voltage source such that current traversing the actuation coil induces a magnetic field having a flux density below a threshold required to change a position of a latchable valve shaft at least partially disposed within the actuation coil, the latchable valve shaft configured to travel with an indicator coil as the valve shaft moves between open and closed positions, the indicator coil acting as a connection in the circuit between the first terminal wire and the second terminal wire of the actuation coil; and
responsive to an indication that a determined position of the latchable fuel tank isolation valve is different than a desired position, adjusting the position of the latchable valve shaft by coupling a voltage source to the actuation coil such that current traversing the actuation coil induces a magnetic field with a flux density above the threshold required to move the latchable valve shaft.

16. The method of claim 15, further comprising:
responsive to the indication that a determined position of the latchable fuel tank isolation valve is different than a desired position of the latchable fuel tank isolation valve, adjusting operation of the fuel system based on a fuel system operation history over a duration wherein the position of the latchable fuel tank isolation valve was indeterminate.

17. The method of claim 15, further comprising:
during a second condition, following adjusting the position of the latchable valve shaft, determining whether the latchable fuel tank isolation valve is in the desired position by electrically coupling the actuation coil to the voltage source such that current traversing the actuation coil induces a magnetic field having a flux density below the threshold and monitoring the current-voltage relationship of the circuit; and
indicating degradation of the latchable fuel tank isolation valve responsive to an indication that the latchable valve shaft is not in the desired position.

* * * * *